United States Patent
Vijayan et al.

(10) Patent No.: US 7,881,245 B2
(45) Date of Patent: *Feb. 1, 2011

(54) LOCAL AND WIDE-AREA TRANSMISSIONS IN A WIRELESS BROADCAST NETWORK

(75) Inventors: Rajiv Vijayan, San Diego, CA (US); Fuyun Ling, San Diego, CA (US); Gordon Kent Walker, Poway, CA (US); Ramaaswamy Murali, San Diego, CA (US); Ashok Mantravadi, San Diego, CA (US); Anand Subramaniam, La Jolla, CA (US); Krishnamurthy Viswanathan, legal representative, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/506,055

(22) Filed: Jul. 20, 2009

(65) Prior Publication Data
US 2009/0279471 A1    Nov. 12, 2009

Related U.S. Application Data

(63) Continuation of application No. 10/968,787, filed on Oct. 18, 2004, now Pat. No. 7,660,275.

(60) Provisional application No. 60/514,152, filed on Oct. 14, 2003.

(51) Int. Cl.
 *H04H 20/71* (2008.01)
(52) U.S. Cl. ................ 370/312; 370/344; 370/347; 370/208; 455/503
(58) Field of Classification Search ............ 370/312, 370/208, 344, 347; 455/67.3, 67.6, 502, 455/503
See application file for complete search history.

(56) References Cited

U.S. PATENT DOCUMENTS 5,513,215 A    4/1996    Marchetto et al.

(Continued)

FOREIGN PATENT DOCUMENTS

| EP | 1244234 | 9/2002 |
|---|---|---|
| JP | 2002064450 | 2/2002 |
| WO | 0176110 | 10/2001 |

OTHER PUBLICATIONS

International Search Report, PCT/US2004/034883, International Searching Authority, European Patent Office, Jul. 6, 2005.

(Continued)

*Primary Examiner*—Nghi H Ly
*Assistant Examiner*—Amancio Gonzalez
(74) *Attorney, Agent, or Firm*—Gerald P. Joyce, III; Sandip S. Minhas

(57) ABSTRACT

To broadcast different types of transmission having different tiers of coverage in a wireless broadcast network, each base station processes data for a wide-area transmission in accordance with a first mode (or coding and modulation scheme) to generate data symbols for the wide-area transmission and processes data for a local transmission in accordance with a second mode to generate data symbols for the local transmission. The first and second modes are selected based on the desired coverage for wide-area and local transmissions, respectively. The base station also generates pilots and overhead information for local and wide-area transmissions. The data, pilots, and overhead information for local and wide-area transmissions are multiplexed onto their transmission spans, which may be different sets of frequency subbands, different time segments, or different groups of subbands in different time segments. More than two different types of transmission may also be multiplexed and broadcast.

50 Claims, 11 Drawing Sheets

U.S. PATENT DOCUMENTS

| | | |
|---|---|---|
| 5,974,034 A | 10/1999 | Chin et al. |
| 5,995,567 A | 11/1999 | Cioffi |
| 6,256,508 B1 | 7/2001 | Nakagawa et al. |
| 6,487,405 B1 | 11/2002 | Dapper |
| 6,535,502 B1 | 3/2003 | Brink |
| 6,594,498 B1 | 7/2003 | McKenna et al. |
| 6,628,659 B1 | 9/2003 | Park |
| 6,675,022 B2 | 1/2004 | Burgan et al. |
| 7,457,231 B2 | 11/2005 | Vijayan |
| 7,103,026 B2 | 9/2006 | Hall et al. |
| 2002/0159430 A1 | 10/2002 | Atarashi et al. |
| 2003/0043887 A1 | 3/2003 | Hudson |
| 2003/0045314 A1 | 3/2003 | Burgan et al. |
| 2004/0252629 A1 | 12/2004 | Hasegawa et al. |
| 2005/0122928 A1* | 6/2005 | Vijayan et al. .............. 370/312 |

OTHER PUBLICATIONS

Written Opinion, PCT/US2004/034883, International Searching Authority, European Patent Office, 2005-07-06.

International Preliminary Report on Patentability, PCT/US2004/034883, International Preliminary Examining Authority, United States, Aug. 28, 2008.

* cited by examiner

LOCAL AND WIDE-AREA TRANSMISSIONS IN A WIRELESS BROADCAST NETWORK

The present Application for Patent is a continuation of patent application Ser. No. 10/968,787 entitled "Local And Wide-Area Transmissions In A Wireless Broadcast Network" filed Oct. 18, 2004, now U.S. Pat. No. 7,660,275, and Provisional Patent Application No. 60/514,152, entitled, "Method for Transmitting Local and Wide-Area Content Over a Wireless Multicast Network," filed Oct. 24, 2009, now expired, both assigned to the assignee hereof and hereby expressly incorporated by reference herein.

BACKGROUND

I. Field

The present invention relates generally to communication, and more specifically to data transmission in a wireless communication network.

II. Background

Wireless and wireline broadcast networks are widely deployed to provide various contents to a large group of users. A common wireline broadcast network is a cable network that delivers multimedia content to a large number of households. A cable network typically includes headends and distribution nodes. Each headend receives programs from various sources, generates a separate modulated signal for each program, multiplexes the modulated signals for all of the programs onto an output signal, and sends its output signal to the distribution nodes. Each program may be distributed over a wide geographic area (e.g., an entire state) or a smaller geographic area (e.g., a city). Each distribution node covers a specific area within the wide geographic area (e.g., a community). Each distribution node receives the output signals from the headends, multiplexes the modulated signals for the programs to be distributed in its coverage area onto different frequency channels, and sends its output signal to households within its coverage area. The output signal for each distribution node typically carries both national and local programs, which are often sent on separate modulated signals that are multiplexed onto the output signal.

A wireless broadcast network transmits data over the air to wireless devices within the coverage area of the network. A wireless broadcast network is different from a wireline broadcast network in several key regards. First, signals transmitted by different base stations in the wireless broadcast network interfere with one another if these signals are not the same. In contrast, the output signal of each distribution node is sent on dedicated cables and thus experiences no interference from other distribution nodes. Second, each base station in the wireless broadcast network typically transmits a single radio frequency (RF) modulated signal that carries data for all programs being broadcast by that base station. In contrast, each distribution node in the wireline broadcast network may multiplex individual modulated signals for different programs onto different frequency channels. Because of these differences, the techniques used to distribute programs in a wireline broadcast network are generally not applicable for a wireless broadcast network.

There is therefore a need in the art for a wireless broadcast network that can efficiently broadcast different types of content with different coverage areas.

SUMMARY

Techniques for broadcasting different types of transmissions (e.g., local and wide-area transmissions) in a wireless broadcast network are described herein. As used herein, "broadcast" and "broadcasting" refer to transmission of content/data to a group of users of any size and may also be referred to as "multicast" or some other terminology. A wide-area transmission is a transmission that may be broadcast by all or many transmitters in the network. A local transmission is a transmission that may be broadcast by a subset of the transmitters for a given wide-area transmission. Different local transmissions may be broadcast by different subsets of the transmitters for a given wide-area transmission. Different wide-area transmissions may also be broadcast by different groups of transmitters in the network. A venue transmission may also be broadcast by a smaller subset of a given subset of transmitters for a given local transmission. The wide-area, local, and venue transmissions may be viewed as different types of transmission having different tiers of coverage, with the coverage area for each transmission being determined by all of the transmitters broadcasting that transmission. The wide-area, local, and venue transmissions typically carry different contents, but these transmissions may also carry the same content.

At each base station (or transmitter) in the wireless broadcast network, data for a wide-area transmission is processed in accordance with a first coding and modulation scheme (or "mode") selected for the wide-area transmission to generate data symbols for the wide-area transmission. Data for a local transmission is processed in accordance with a second coding and modulation scheme selected for the local transmission to generate data symbols for the local transmission. The first and second coding and modulation schemes may be selected based on the desired coverage from the base station for the wide-area and local transmissions, respectively. A time division multiplexed (TDM) pilot and/or a frequency division multiplexed (FDM) pilot used to recover the local and wide-area transmissions are generated. Overhead information indicative of the time and/or frequency location of each data channel sent in the local and wide-area transmissions is also determined. The data channels carry multimedia content and/or other data being sent in the local and wide-area transmissions.

The data, pilots, and overhead information for local and wide-area transmissions may be multiplexed in various manners. For example, the data symbols for the wide-area transmission may be multiplexed onto a "transmission span" allocated for the wide-area transmission, the data symbols for the local transmission may be multiplexed onto a transmission span allocated for the local transmission, the TDM and/or FDM pilots for the wide-area transmission may be multiplexed onto a transmission span allocated for these pilots, and the TDM and/or FDM pilots for the local transmission may be multiplexed onto a transmission span allocated for these pilots. The overhead information for the local and wide-area transmissions may be multiplexed onto one or more designated transmission spans. The different transmission spans may correspond to (1) different sets of frequency subbands if FDM is utilized by the wireless broadcast network, (2) different time segments if TDM is utilized, or (3) different groups of subbands in different time segments if both TDM and FDM are utilized. Various multiplexing schemes are described below. More than two different types of transmission with more than two different tiers of coverage may also be processed, multiplexed, and broadcast.

A wireless device in the wireless broadcast network performs the complementary processing to recover the data for the local and wide-area transmissions. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
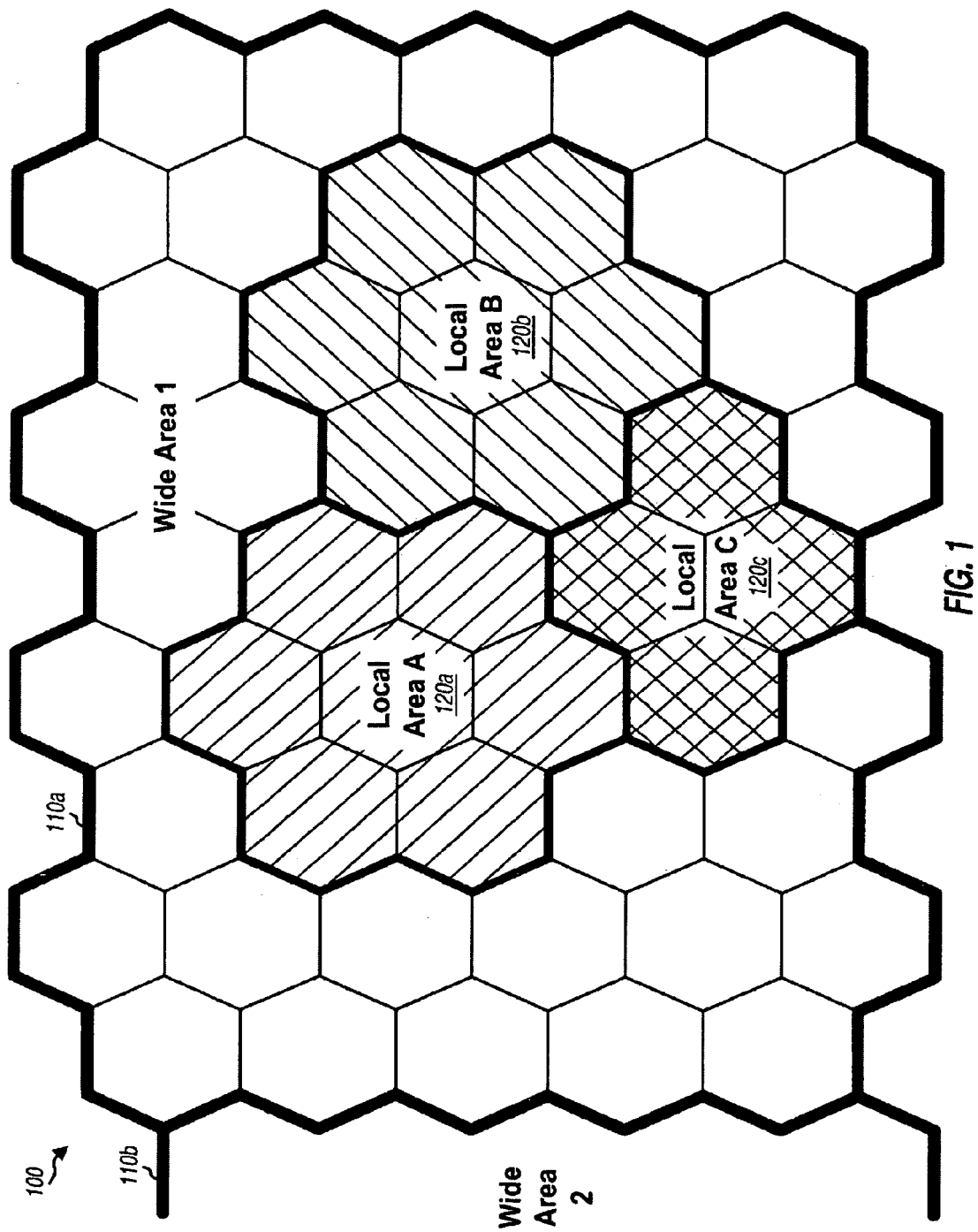
FIG. 1 shows a wireless broadcast network.

FIG. 1 shows a wireless broadcast network 100 that can broadcast different types of transmission such as, for example, wide-area transmissions and local transmissions. Each wide-area transmission is broadcast by a set of base stations in the network, which may include all or many base stations in the network. Each wide-area transmission is typically broadcast over a large geographic area. Each local transmission is broadcast by a subset of the base stations in a given set for a given wide-area transmission. Each local transmission is typically broadcast over a smaller geographic area. For simplicity, the large geographic area for a wide-area transmission is also called a wide coverage area or simply a "wide area", and the smaller geographic area for a local transmission is also called a local coverage area or simply a "local area". Network 100 may have a large coverage area such as the entire United States, a large region of the United States (e.g., the western states), an entire state, and so on. For example, a single wide-area transmission may be broadcast over the entire state of California, and different local transmissions may be broadcast over different cities such as Los Angeles and San Diego.

For simplicity, FIG. 1 shows network 100 covering wide areas 110a and 110b, with wide-area 110a encompassing three local areas 120a, 120b, and 120c. In general, network 100 may include any number of wide areas with different wide-area transmissions and any number of local areas with different local transmissions. Each local area may adjoin another local area or may be isolated. Network 100 may also broadcast any number of different types of transmission designated for reception over geographic areas of any number of different sizes. For example, network 100 may also broadcast a venue transmission designated for reception over a smaller geographic area, which may be portion of a given local area. For simplicity, in much of the following description, network 100 is assumed to cover a single wide area and multiple local areas for two different transmission types.

Figure 2A:
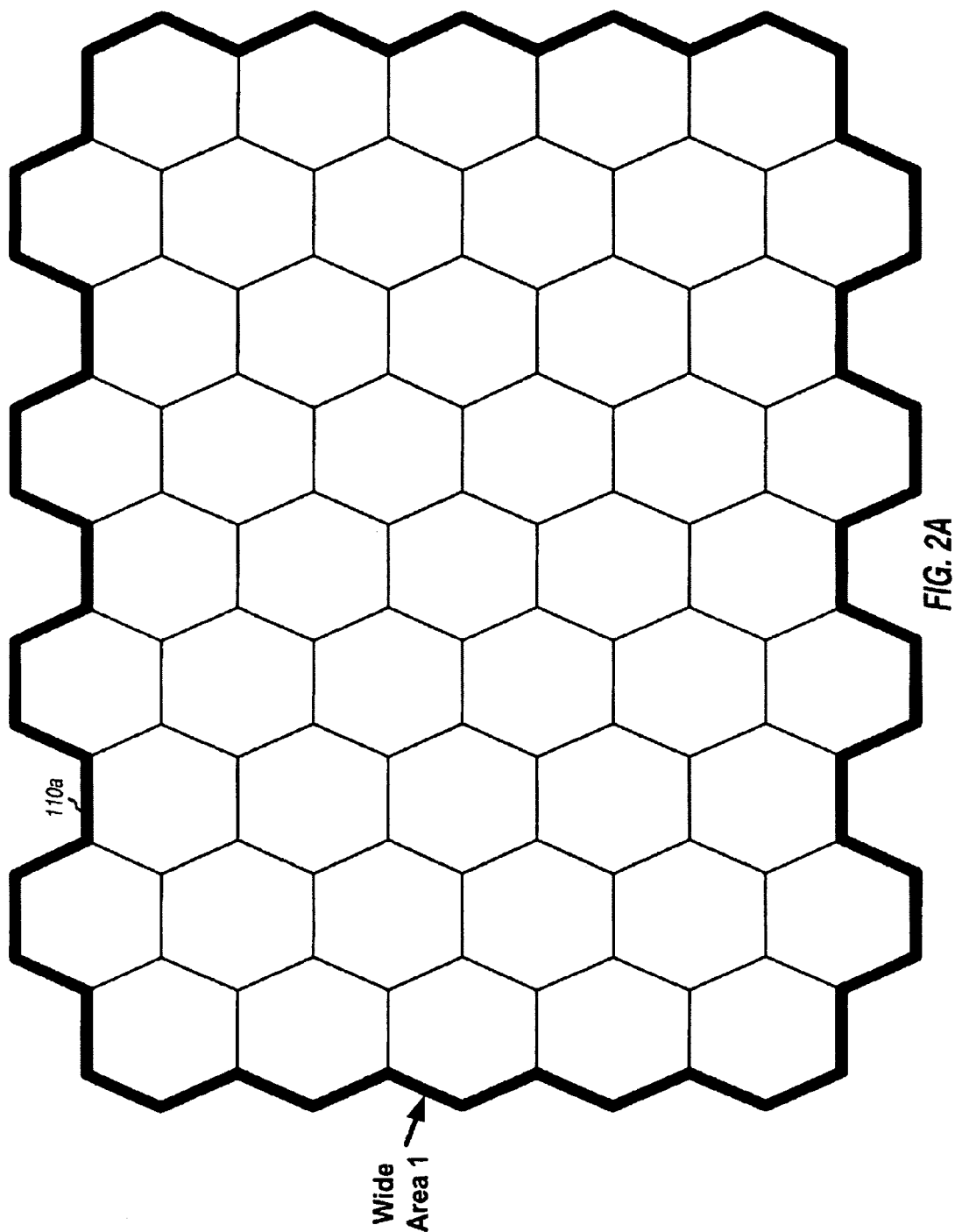
FIG. 2A shows coverage area for a wide-area transmission.

FIG. 2A shows the coverage area for a wide-area transmission in network 100. All base stations in a given wide area broadcast the same wide-area transmission, and the network is referred to as a single frequency network (SFN). If all base stations in the wide area broadcast the same wide-area transmission, then a wireless device may combine signals received from different base stations for improved performance. At a physical layer, the primary impairments to data reception in SFN are thermal noise and performance degradation due to time variation and excess delay spread of the wireless channel. Delay spread is the time difference between the earliest arriving signal instance (or multipath) and the latest arriving signal instance at the wireless device.

Figure 2B:
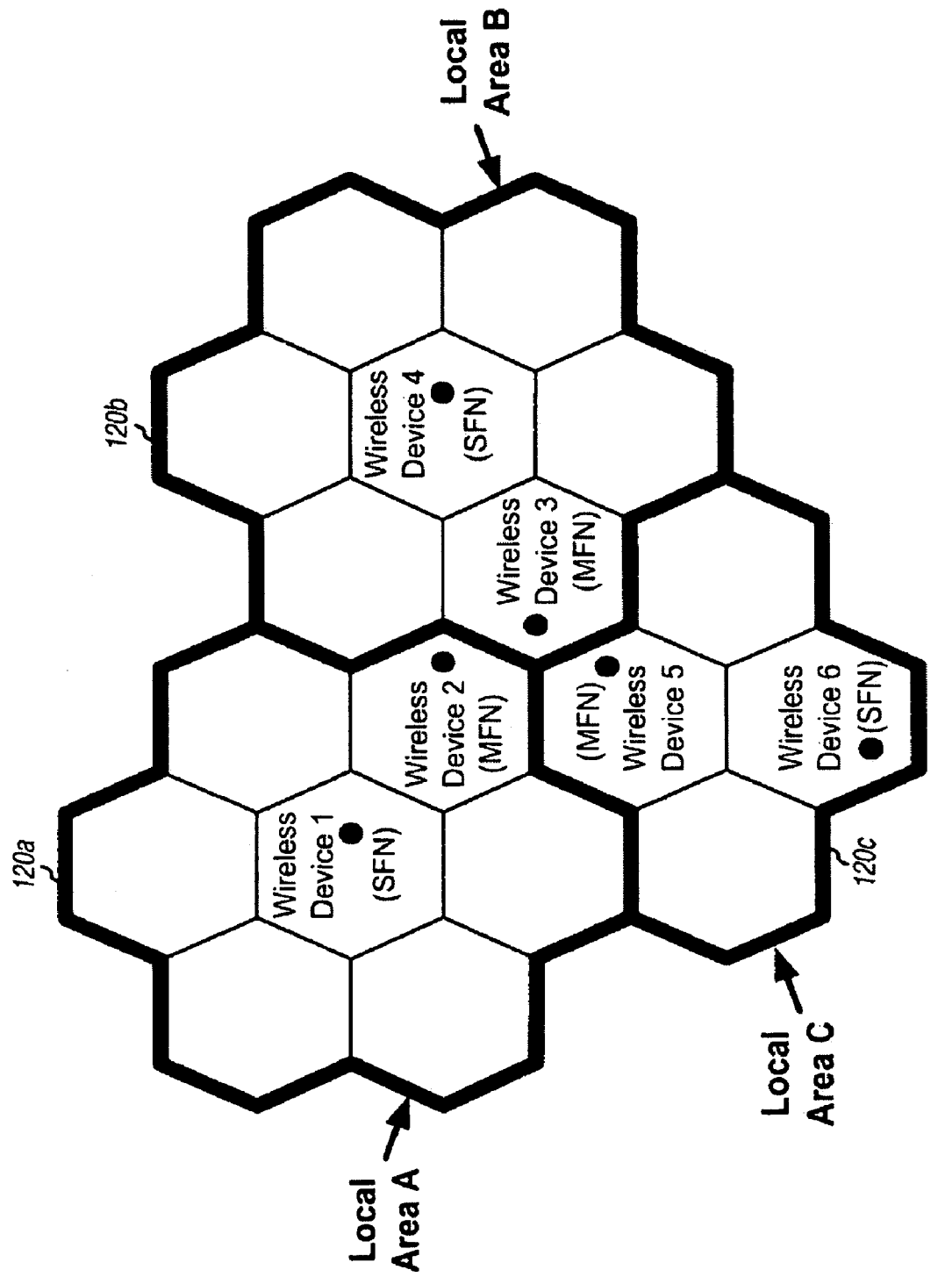
FIG. 2B shows coverage areas for different local transmissions.

FIG. 2B shows the different coverage areas for different local transmissions in network 100. The base stations in different local areas transmit different local transmissions, and the network is referred to as a multiple frequency network (MFN). The terms "SFN" and "MFN" are broadcast terminology commonly used to describe the characteristics of a network, and MFN does not necessarily mean that different base stations transmit on different radio frequencies. Even though the base stations in different local areas broadcast different local transmissions, a wireless device within the interior of a given local area may experience little interference from the base stations in neighboring local areas because of the relatively large distance to the interfering base stations. For example, wireless device 1 in local area A, wireless device 4 in local area B, and wireless device 6 in local area C may experience little interference from neighboring local areas. The local transmission is essentially SFN in character for these interior wireless devices.

A wireless device near the boundary of a local area may observe significant adjacent local channel interference (ALCI) from the signals transmitted by base stations in neighboring local areas. For example, wireless device 2 in local area A may experience significant ALCI from base stations in neighboring local areas B and C, wireless device 3 in local area B may experience significant ALCI from base stations in neighboring local areas A and C, and wireless device 5 in local area C may experience significant ALCI from base stations in neighboring local areas A and B. The network is essentially MFN in character for these peripheral wireless devices. The ALCI results in additional performance degradation over the SFN case. If data is processed and transmitted in the same manner for both SFN and MFN, then the ALCI observed by the peripheral wireless devices in the MFN case degrades the received signal quality at these wireless devices and causes a reduction in coverage at the boundary of neighboring local areas.

In general, the coverage for each type of transmission (e.g., wide-area or local) may be matched to the usage requirement for that transmission type. A transmission with wider applicability may be sent to by wireless devices in a larger geographic area. Conversely, a transmission with more limited applicability may be sent to wireless devices in a smaller geographic area.

Network 100 may be designed to provide good performance for both local and wide-area transmissions. This may be achieved by performing the following:

Multiplexing the local and wide-area transmissions in time, frequency, and/or code domain so that interference between the two types of transmission is reduced;

Transmitting the local and wide-area transmissions (as well as their associated pilots) based on different characteristics of MFN and SFN, respectively; and Providing flexibility in resource allocation to meet variable (source) rate demands of the local and wide-area transmissions.

The local transmissions are sent based on MFN characteristics to provide better coverage for wireless devices located at the edges of the local areas. Wide-area transmissions for different wide areas are also MFN in character at the boundary between these wide areas and may also be sent using the techniques described herein. Each of the above three aspects is described in detail below.

1. Multiplexing Local and Wide-Area Transmissions

Figure 3B:
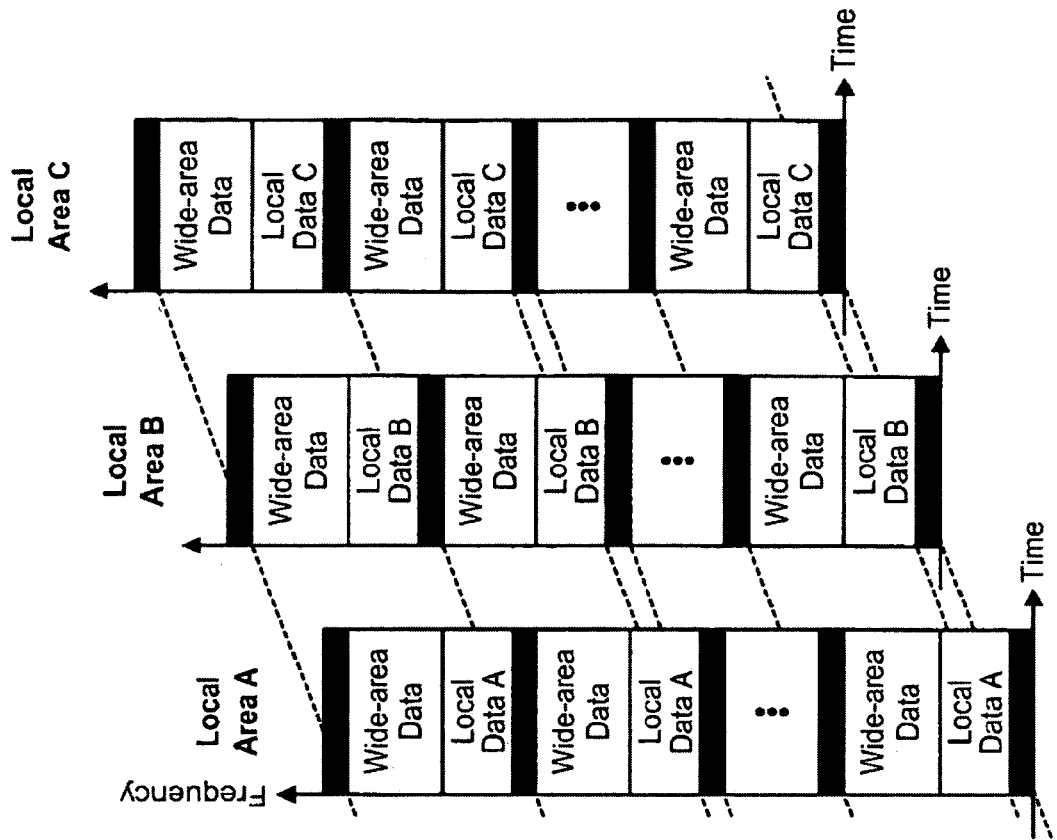
FIG. 3B shows broadcast transmissions using the FDM structure in FIG. 3A.
Figure 3A:
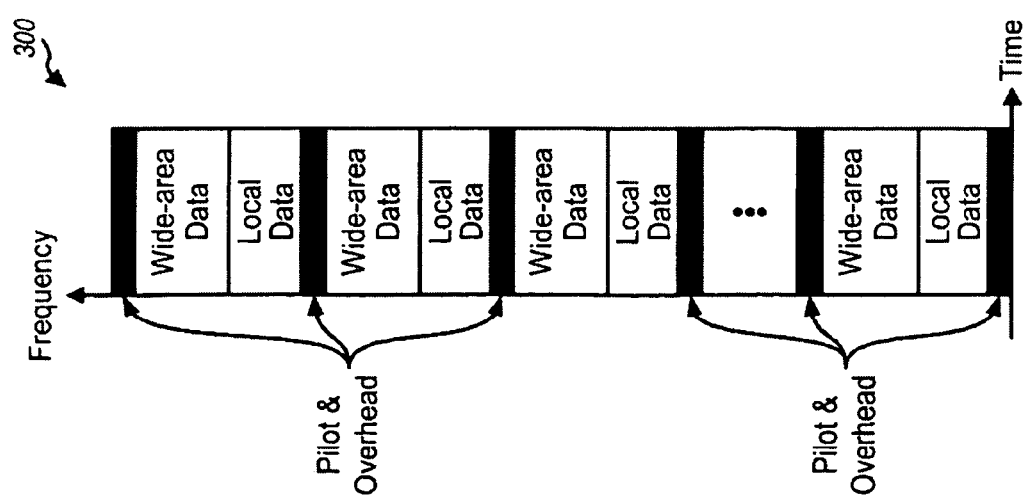
FIG. 3A shows an FDM structure for broadcasting local and wide-area transmissions.

FIG. 3A shows an FDM structure 300 that may be used to broadcast local and wide-area transmissions over a given system bandwidth in a multi-carrier network. FDM structure 300 supports reception of both local and wide-area transmissions by a receiver tuned to a single radio frequency, and is different from a scheme that sends local and wide-area transmissions using different radio frequencies. The overall system bandwidth is divided into multiple (N) orthogonal frequency subbands by using a multi-carrier modulation technique such as orthogonal frequency division multiplexing (OFDM) or by some other construct. These subbands are also called tones, carriers, subcarriers, bins, and frequency channels. With OFDM, each subband is associated with a respective subcarrier that may be modulated with data. Of the N total subbands, U subbands may be used for data and pilot transmission and are called "usable" subbands, where $U \leq N$. The G remaining subbands are not used and are called "guard" subbands, where $N=U+G$. As a specific example, the network may utilize an OFDM structure with N=4096 total subbands, U=4000 usable subbands, and G=96 guard subbands. In general, N, U, and G may be any values. For simplicity, the following description assumes that all N subbands are usable for transmission, i.e., U=N and G=0 so that there are no guard subbands.

In each symbol period with data transmission, P subbands out of the N usable subbands may be used for an FDM pilot and are called "pilot" subbands, where P<N. A pilot is typically composed of known modulation symbols that are processed and transmitted in a known manner. The remaining D usable subbands may be used for data transmission and are called "data" subbands, where D=N−P. A TDM pilot may also be transmitted in some symbol periods on all N usable subbands.

For the embodiment shown in FIG. 3A, an FDM pilot is transmitted on P pilot subbands that are distributed across the entire system bandwidth to provide better sampling of the frequency spectrum. The D data subbands may be allocated to local transmission, wide-area transmission, overhead information, and so on. A set of $L_{sb}$ subbands may be allocated for local transmission, and a set of $W_{sb}$ subbands may be allocated for wide-area transmission, where $W_{sb}+L_{sb} \leq D$. The $W_{sb}$ subbands for wide-area transmission and the $L_{sb}$ subbands for local transmission may be distributed across the entire system bandwidth to improve frequency diversity, as shown in FIG. 3A. The $W_{sb}$ subbands carry data for wide-area transmission (or simply, wide-area data), and the $L_{sb}$ subbands carry data for local transmission (or simply, local data).

FIG. 3B shows data transmission for different local areas using FDM structure 300. To minimize interference between the local and wide-area transmissions, all base stations in a given wide area may use the same set of $W_{sb}$ subbands to broadcast the wide-area transmission. Base stations in different local areas may broadcast different local transmissions on the set of $L_{sb}$ subbands allocated for the local transmissions. The number of subbands allocated for the local and wide-area transmissions may be varied based on resource requirements. For example, $W_{sb}$ and $L_{sb}$ may be varied (1) dynamically from symbol to symbol or from time slot to time slot, (2) based on time of the day, day of the week, and so on, (3) based on a predetermined schedule, or (4) based on any combination of the above. For example, $W_{sb}$ and $L_{sb}$ may be dynamically varied during a portion of each weekday, fixed during the remaining portion of each weekday, and set based on a predetermined schedule on the weekend.

To simplify resource allocation and improve frequency diversity, the N usable subbands may be arranged into M "interlaces" or disjoint subband sets. The M interlaces are disjoint in that each of the N usable subbands belongs to only one interlace. Each interlace contains P usable subbands, where N=M·P. The P subbands in each interlace may be uniformly distributed across the N usable subbands such that consecutive subbands in each interlace are spaced apart by M subbands. For the exemplary OFDM structure described above, M=8 interlaces may be formed, with each interlace containing P=512 usable subbands that are uniformly spaced apart by 8 subbands. The P usable subbands in each interlace are thus interlaced with the P usable subbands in each of the other M−1 interlaces.

An exemplary OFDM structure and interlace scheme have been described above. Other OFDM structures and subband allocation schemes may also be used to support FDM of local and wide-area transmissions.

Figure 4A:
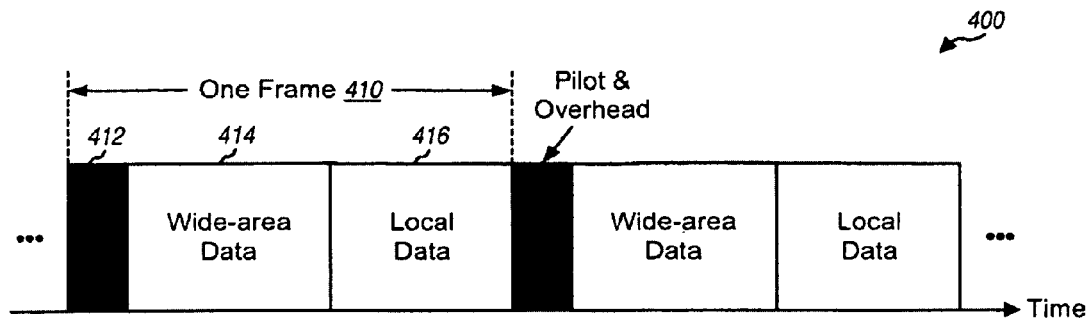
FIG. 4A shows a TDM structure for broadcasting local and wide-area transmissions.

FIG. 4A shows a TDM structure 400 that may also be used to broadcast local and wide-area transmissions in a single-carrier or multi-carrier network. The transmission timeline is divided into frames 410, with each frame having a predetermined time duration. The frame duration may be selected based on various factors such as, e.g., the amount of time diversity desired for data transmission. Each frame includes a field 412 carrying pilot and overhead information, a segment 414 carrying wide-area data, and a segment 416 carrying local data. Each frame may also include other fields for other information.

Figure 4B:
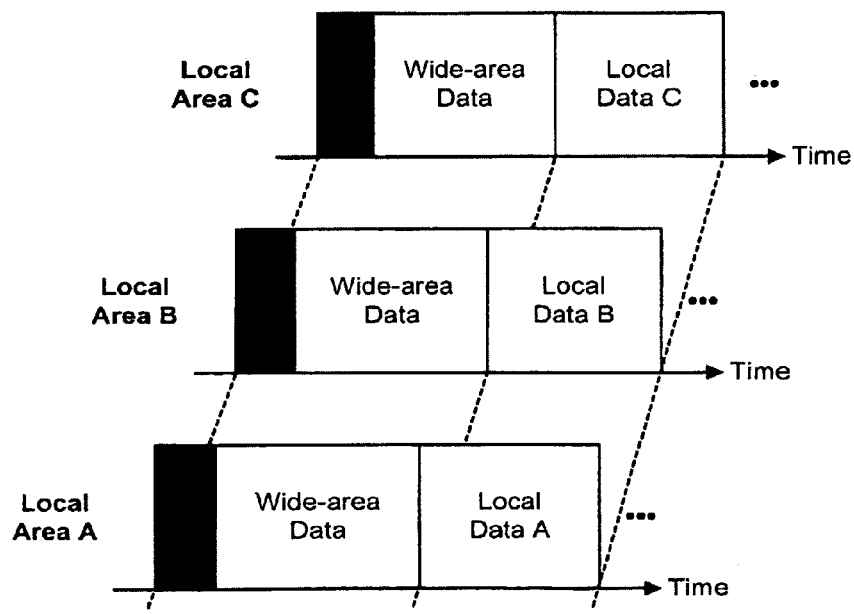
FIG. 4B shows broadcast transmissions using the TDM structure in FIG. 4A.

FIG. 4B shows data transmissions for different local areas using TDM structure 400. To minimize interference between the local and wide-area transmissions, wide-area segment 414 for all base stations in a given wide area may be time-aligned so that these base stations broadcast the wide-area transmission at the same time. The base stations in different local areas may broadcast different local transmissions in segment 416. The sizes of segments 414 and 416 may be varied dynamically or in a predetermined manner based on resource requirements.

For FDM structure 300 in FIG. 3A and TDM structure 400 in FIG. 4A, the local and wide-area transmissions are multiplexed in frequency and time, respectively, such that the two types of transmission minimally overlap one another. This alignment avoids or minimizes interference between the two transmission types. However, strict adherence to the non-overlapping of different transmission types is not necessary. Furthermore, different local areas may have different frequency or time allocations. In general, various multiplexing structures may be used to broadcast different types of transmission with different coverage areas. A specific multiplexing structure suitable for an OFDM-based wireless broadcast network is described below.

Figure 5:
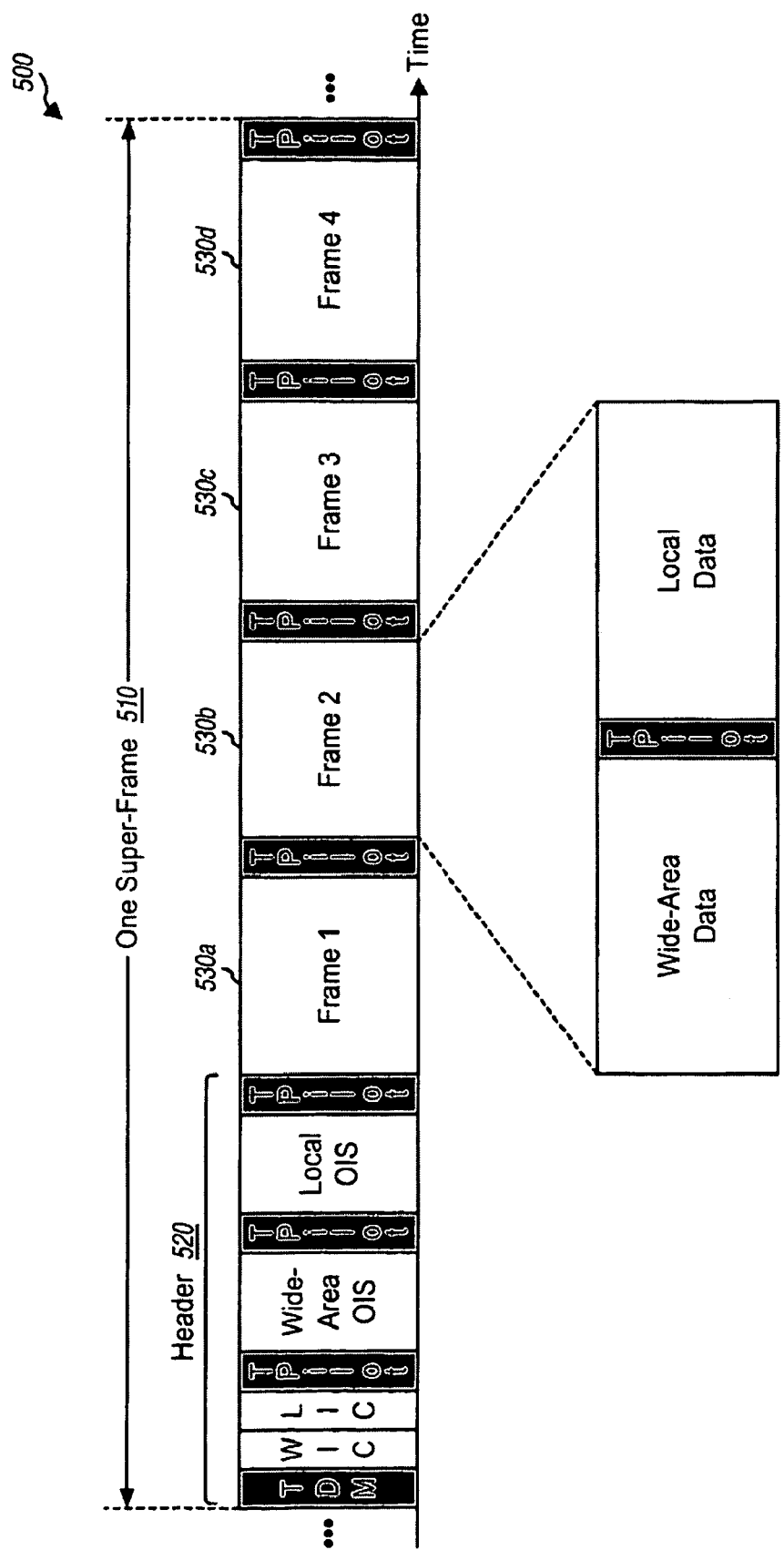
FIG. 5 shows a super-frame structure for broadcasting local and wide-area transmissions.

FIG. 5 shows an exemplary super-frame structure 500 that may be used to broadcast local and wide-area transmissions in an OFDM-based wireless broadcast network. Data transmission occurs in units of super-frames 510. Each super-frame spans a predetermined time duration, which may be selected based on various factors such as, for example, the desired statistical multiplexing for data streams being broadcast, the amount of time diversity desired for the data streams, acquisition time for the data streams, buffer requirements for the wireless devices, and so on. A super-frame size of approximately one second may provide a good tradeoff between the various factors noted above. However, other super-frame sizes may also be used.

For the embodiment shown in FIG. 5, each super-frame 510 includes a header segment 520, four equal-size frames 530a through 530d, and a trailer segment 540, which are not shown to scale in FIG. 5. Table 1 lists the various fields for segments 520 and 540 and for each frame 530.

TABLE 1

| Fields | Description |
| --- | --- |
| TDM pilot | TDM pilot used for signal detection, frame synchronization, frequency error estimation, and time synchronization. |
| Transition pilot | Pilot used for channel estimation and possibly time synchronization and sent at the boundary of wide-area and local fields/transmissions. |
| WIC | Wide-area identification channel (WIC) - carry an identifier assigned to the wide area being served. |
| LIC | Local identification channel (WIC) - carry an identifier assignedto the local area being served. |
| Wide-Area OIS | Wide-area overhead information symbol (OIS) - carry overhead information (e.g., frequency/time location and allocation) for each data channel being sent in the Wide-Area Data field. |
| Local OIS | Local OIS - carry overhead information for each data channel being sent in the Local Data field. |
| Wide-Area Data | Carry data channels for wide-area transmission. |
| Local Data | Carry data channels for local transmission. |

For the embodiment shown in FIG. 5, different pilots are used for different purposes. A TDM pilot is transmitted at or near the start of each super-frame and may be used for the purposes noted in Table 1. A transition pilot is sent at the boundary between local and wide-area fields/transmissions, allows for seamless transition between the local and wide-area fields/transmissions, and may be generated as described below.

The local and wide-area transmissions may be for multimedia content such as video, audio, teletext, data, video/audio clips, and so on, and may be sent in separate data streams. For example, a single multimedia (e.g., television) program may be sent in three separate data streams for video, audio, and data. The data streams are sent on data channels. Each data channel may carry one or multiple data streams. A data channel carrying data streams for a local transmission is also called a "local channel", and a data channel carrying data streams for a wide-area transmission is also called a "wide-area channel". The local channels are sent in the Local Data fields and the wide-area channels are sent in the Wide-Area Data fields of the super-frame.

Each data channel may be "allocated" a fixed or variable number of interlaces in each super-frame depending on the payload for the data channel, the availability of interlaces in the super-frame, and possibly other factors. Each data channel may be active or inactive in any given super-frame. Each active data channel is allocated at least one interlace. Each active data channel is also "assigned" specific interlaces within the super-frame based on an assignment scheme that attempts to (1) pack all of the active data channels as efficiently as possible, (2) reduce the transmission time for each data channel, (3) provide adequate time-diversity for each data channel, and (4) minimize the amount of signaling needed to indicate the interlaces assigned to each data channel. For each active data channel, the same interlace assignment may be used for the four frames of the super-frame.

The Local OIS field indicates the time-frequency assignment for each active local channel for the current super-frame. The Wide-Area OIS field indicates the time-frequency assignment for each active wide-area channel for the current super-frame. The Local OIS and Wide-Area OIS are sent at the start of each super-frame to allow the wireless devices to determine the time-frequency location of each data channel of interest in the super-frame.

The various fields of the super-frame may be sent in the order shown in FIG. 5 or in some other order. In general, it is desirable to send the TDM pilot and overhead information early in the super-frame so that the TDM pilot and overhead information can be used to receive the data being sent later in the super-frame. The wide-area transmission may be sent prior to the local transmission, as shown in FIGS. 4A and 5, or after the local transmission.

FIG. 5 shows a specific super-frame structure. In general, a super-frame may span any time duration and may include any number and any type of segments, frames, and fields. However, there is normally a useful range of super-frame durations related to acquisition time and cycling time for the receiver electronics. Other super-frame and frame structures may also be used for broadcasting different types of transmission, and this is within the scope of the invention.

Time division multiplexing of the local and wide-area transmissions, as shown in FIG. 5, allows the wide-area transmission to enjoy the advantages of OFDM within an SFN context, without interference from local transmissions. Since only local or wide-area transmission is sent at any given moment with TDM, the local and wide-area transmissions may be broadcast using different transmission parameters that may be independently optimized to achieve good performance for the local and wide-area transmissions, respectively, as described below.

2. Data Transmission

The wide-area channels that are broadcast in each super-frame may be packed as efficiently as possible. All base stations in a given wide area broadcast the same wide-area transmission in the four Wide-Area Data fields of each super-frame. A wireless device may then combine wide-area transmissions received from any number of base stations to improve data reception performance.

The base stations in different local areas broadcast different local transmissions in the four Local Data fields of each super-frame. A peripheral wireless device located near the boundary of neighboring local areas would then observe adjacent local channel interference (ALCI), which degrades the received signal quality at the device. Received signal quality may be quantified by a signal-to-noise-and-interference ratio (SINR) or some other measure. The peripheral wireless device would achieve a lower SINR because of the degradation due to ALCI. At a base station, data for the local transmission is processed with a coding and modulation scheme that requires a particular SINR for proper reception. ALCI has the effect of shrinking the local area since a given wireless device can achieve the required SINR in a smaller area in the presence of ALCI.

Various techniques may be used to improve coverage for the local transmission. These techniques typically trade off performance in the interior of the local area in order to extend coverage at the boundary. These techniques include partial loading and coding/modulation selection.

With partial loading, which is also called frequency reuse, not all subbands usable for data transmission are actually used to transmit data. Furthermore, neighboring local areas may be assigned subbands such that their local transmissions interfere as little as possible with one another. This may be achieved with orthogonal partial loading or random partial loading.

With orthogonal partial loading, neighboring local areas are assigned disjoint or non-overlapping sets of subbands. The base stations in each local area then broadcast the local transmission on the set of subbands assigned to that local area. Since the subband sets are disjoint, the wireless devices in each local area observe no ALCI from base stations in neighboring local areas.

Figure 6:
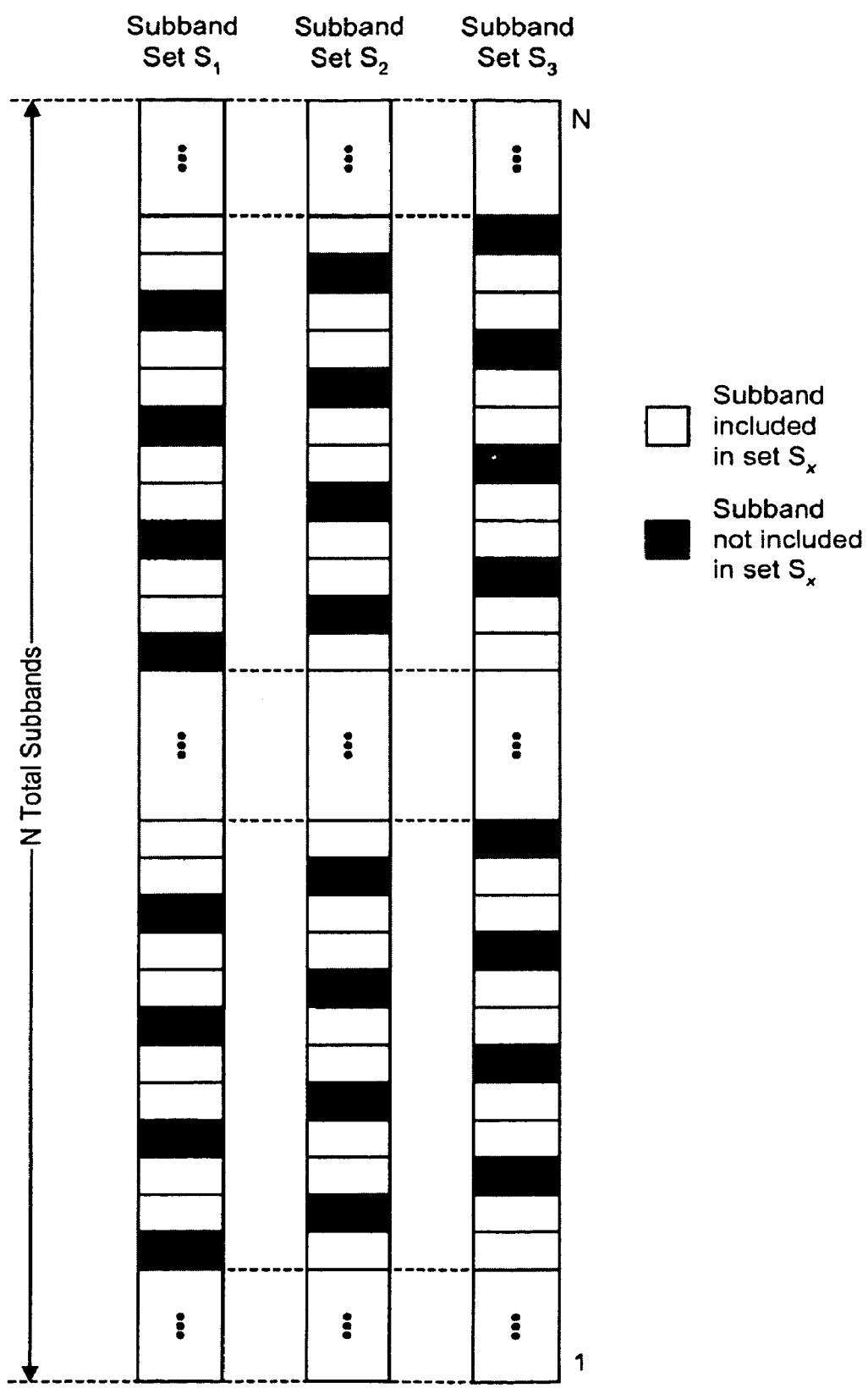
FIG. 6 shows partitioning of data subbands into three disjoint sets.

FIG. 6 shows an exemplary partitioning of the D data subbands into three disjoint sets labeled as $S_1$, $S_2$ and $S_3$. In general, each set may contain any number of data subbands and any one of the D data subbands. The subbands for each set may also change dynamically or in a predetermined manner. To achieve frequency diversity, each set may contain subbands taken from across the D data subbands. The subbands in each set may be uniformly or non-uniformly distributed across the D data subbands.

Referring back to FIG. 2B, local area A may be assigned subband set $S_1$, local area B may be assigned subband set $S_2$, and local area C may be assigned subband set $S_3$. The base stations in local area A then broadcast the local transmission for local area A on subband set $S_1$, the base stations in local area B broadcast the local transmission for local area B on subband set $S_2$, and the base stations in local area C broadcast the local transmission for local area C on subband set $S_3$.

FIGS. 2B and 6 show a case with three local areas. Orthogonal partial loading may be extended to any number of local areas. Q disjoint subband sets may be formed for Q neighboring local areas, where Q>1. The Q sets may contain the same or different numbers of subbands. For the interlace scheme described above, the M−1 interlaces available for data transmission may be allocated to the Q sets. Each set may contain any number of interlaces. The interlaces for each set may change dynamically or in a predetermined manner. Each local area is assigned a respective set of interlaces for local transmission. Frequency planning may be performed across the entire network to ensure that neighboring local areas are assigned disjoint sets.

With random partial loading, each local area is allocated K data subbands, where $K \leq D$, and the base stations in that local area broadcasts the local transmission on K subbands selected in a pseudo-random manner from among the D data subbands. For each local area, a pseudo-random number (PN) generator may be used to select a different set of K subbands in each symbol period. Different local areas may use different PN generators so that the subbands used by each local area are pseudo-random with respect to the subbands used by neighboring local areas. In effect, the local transmission for each local area hops across the D data subbands. ALCI is observed whenever a collision occurs and neighboring local areas use the same subband in the same symbol period. However, ALCI is randomized due to the pseudo-random manner in which the K subbands are selected in each symbol period for each local area. A wireless device has knowledge of the hopping performed by the base stations and can perform the complementary de-hopping to recover the local transmission.

For random partial loading, the probability of collision decreases and the amount of ALCI decreases as K decreases. Coverage may thus be extended with a smaller value of K. However, a smaller K also results in lower overall throughput for a given coding and modulation scheme. K may thus be selected based on a tradeoff between coverage area and overall throughput.

For partial loading of any type, the transmit power for each subband used for data transmission may be increased without increasing the total transmit power. The total transmit power may be distributed over the K subbands used for local transmission in each symbol period, which may be called the "active" subbands. If K subbands are used for local transmission and D subbands are used for wide-area transmission, where K<D with partial loading, then the transmit power per active subband is higher for the local transmission than for the wide-area transmission. The received signal quality per active subband is thus higher with partial loading, which improves the signal-to-noise ratio for the subband at a receiver.

Orthogonal and random partial loading may be performed for only data subbands, only pilot subbands, or both data and pilot subbands. Orthogonal and random partial loading can improve coverage at the expense of a lower overall throughput. This is because fewer subbands are used for data transmission with partial loading, and fewer information bits may be sent in each symbol period on these fewer subbands. The number of subbands to use for local transmission may be selected based on a tradeoff between improved coverage and overall throughput.

The network may support a set of transmission modes, or simply "modes". Each mode is associated with a particular coding scheme or code rate, a particular modulation scheme, a particular spectral efficiency, and a particular minimum SINR required to achieve a specified level of performance, e.g., 1% packet error rate (PER) for a non-fading AWGN channel. Spectral efficiency may be given in units of information bits per modulation symbol and is determined based on the code rate and the modulation scheme. In general, modes with lower spectral efficiencies have lower required SINRs. For each mode, the required SINR may be obtained based on the specific system design (such as the code rate, interleaving scheme, and modulation scheme used for that mode) and for a particular channel profile. The required SINR may be determined by computer simulation, empirical measurements, and so on.

The coverage area for a local transmission may be adjusted by selecting an appropriate mode to use for the local transmission. A mode with a lower required SINR may be used for the local transmission in order to extend coverage near the boundary of neighboring local areas. The particular mode to use for the local transmission may be selected based on a tradeoff between improved coverage and spectral efficiency. The coverage for a wide-area transmission may similarly be adjusted by selecting an appropriate mode to use for the wide-area transmission. In general, the same or different modes may be used for local and wide-area transmissions.

The coverage for the local transmission may be improved with partial loading and/or mode selection. Coverage may be extended by using a smaller percentage of the usable subbands and/or by selecting a mode with a lower spectral efficiency. An information bit rate (R) may be expressed as: $R = \eta \times K$, where $\eta$ is the spectral efficiency for the selected mode and K is the number of active subbands. A given information bit rate may be achieved by using (1) a subset of all data subbands and a mode with a higher spectral efficiency or (2) all data subbands and a mode with a lower spectral efficiency. It can be shown that option (2) can provide better performance (e.g., wider coverage for a given PER) than option (1) for certain operating scenarios (e.g., for random partial loading and without interference estimation).

3. Pilot Transmission

Figure 7:
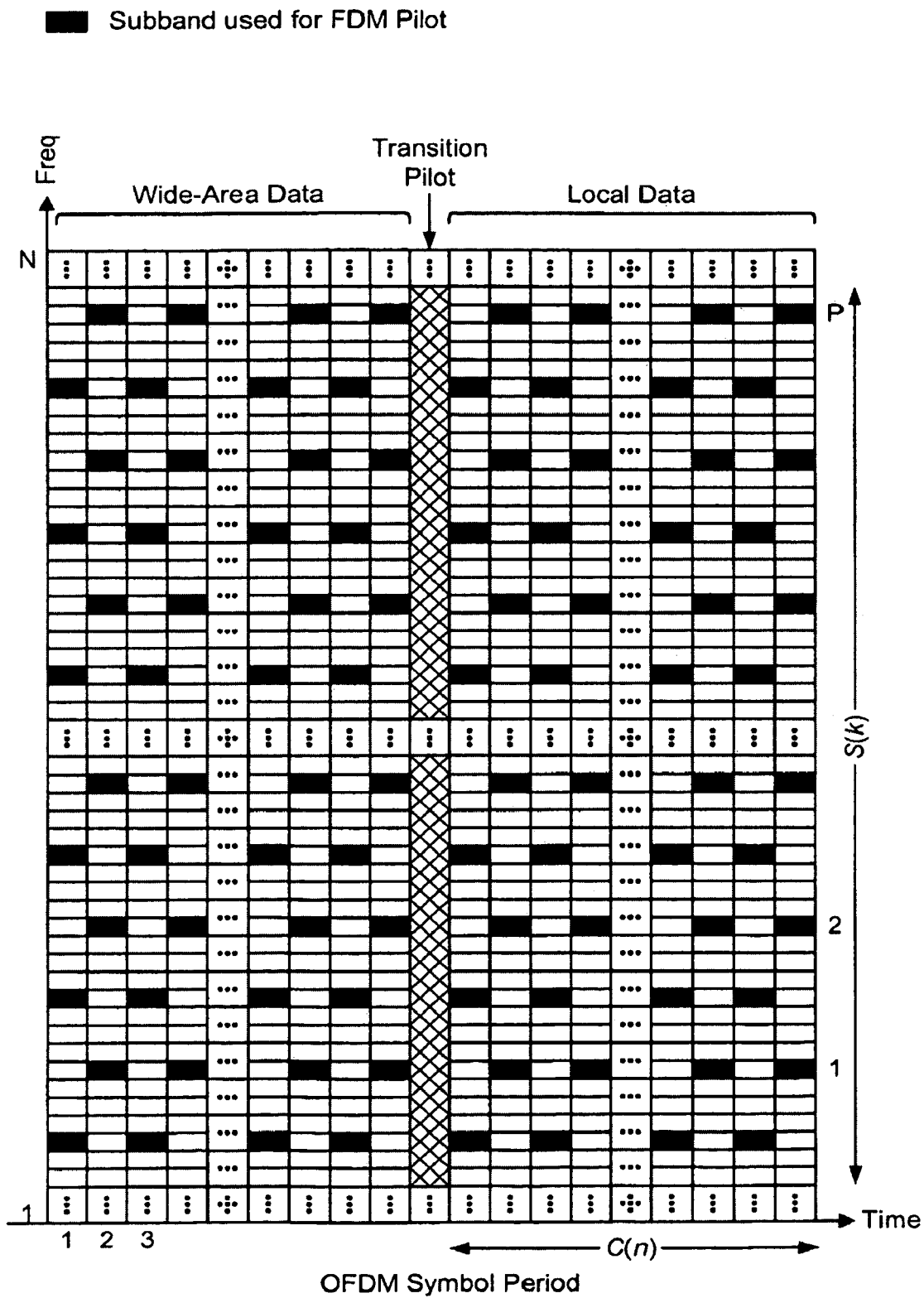
FIG. 7 shows an FDM pilot for local and wide-area transmissions.

FIG. 7 shows a pilot transmission scheme that can support both local and wide-area transmissions. For simplicity, FIG. 7 shows pilot transmission for one frame of a super-frame. Each base station transmits the transition pilot between local and wide-area fields/transmissions. Each base station also transmits the FDM pilot on one interlace in each symbol period with data transmission. For the embodiment shown in FIG. 7, eight interlaces are available in each symbol period, and the FDM pilot is transmitted on interlace 3 in even-numbered symbol period indices and on interlace 7 in odd-numbered symbol period indices, which may be denoted as a {3, 7} staggering pattern. The FDM pilot may also be transmitted with other staggering patterns such as, e.g., the {1, 2, 3, 4, 5, 6, 7, 8} and {1, 4, 7, 2, 5, 8, 3, 6} patterns.

As shown in FIG. 7, the FDM pilot is transmitted during the wide-area transmission as well as during the local transmission. The FDM pilot may be used to derive (1) a channel estimate for the wide-area transmission, which is also called a wide-area channel estimate, and (2) a channel estimate for the local transmission, which is also called a local channel estimate. The local and wide-area channel estimates may be used for data detection and decoding for the local and wide-area transmissions, respectively.

The FDM pilot transmitted during the wide-area transmission is called a wide-area FDM pilot and may be designed to facilitate wide-area channel estimation. The same wide-area FDM pilot may be transmitted across the entire wide area. The FDM pilot transmitted during the local transmission is called a local FDM pilot and may be designed to facilitate local channel estimation. Different local FDM pilots may be transmitted for different local areas to allow the wireless devices to obtain local channel estimates for the different local areas. The different local FDM pilots interfere with one another at the boundary of neighboring local areas, similar to the ALCI for the different local transmissions. The local FDM pilots may be designed such that a good local channel estimate may be derived in the presence of pilot interference from neighboring local areas. This may be achieved by orthogonalizing or randomizing the local FDM pilots for different local areas in frequency, time, and/or code domain, as described below.

FIG. 7 also shows an embodiment of the local FDM pilot. A set of P modulation symbols is used for the P pilot subbands for the local FDM pilot. The P modulation symbols may be multiplied with a first sequence of complex values across frequency and/or a second sequence of complex values across time to generate the pilot symbols for the local FDM pilot. The first sequence is denoted as {S(k)}, where S(k) is the complex value for subband k. The second sequence is denoted as {C(n)}, where C(n) is the complex value for symbol period n. Different characteristics may be obtained for the local FDM pilot by using different types of first and second sequences.

A PN generator may be used to generate the first sequence of complex values. The PN generator may be a linear feedback shift register (LFSR) that implements a selected generator polynomial, e.g., $g(x)=x^{15}+x^{14}+1$. The PN generator is initialized to a particular seed value (or initial state) at the start of each symbol period and generates a sequence of pseudo-random bits. These bits are used to form the complex values for the first sequence.

The pilot symbols for the local FDM pilot for a given local area may be expressed as:

$$P(k,n)=S(k)\cdot C(n) \qquad \text{Eq (1)}$$

where P(k,n) is the pilot symbol for subband k in symbol period n. Equation (1) assumes that the modulation symbols used for the local FDM pilot have values of 1+j0.

The received pilot symbols at a wireless device may be expressed as:

$$Y(k,n)=H(k,n)\cdot P(k,n)+H_I(k,n)\cdot P_I(k,n)+w(k,n), \qquad \text{Eq (2)}$$

where P(k,n) is a pilot symbol sent on subband k in symbol period n by a base station in a desired local area (i.e., the desired base station);

H(k,n) is an actual channel response for the desired base station;

$P_I(k,n)$ is a pilot symbol sent on subband k in symbol period n by an interfering base station in a neighboring local area;

$H_I(k,n)$ is an actual channel response for the interfering base station;

Y(k,n) is a received pilot symbol for subband k in symbol period n; and w(k,n) is noise for subband k in symbol period n.

For simplicity, equation (2) assumes the presence of one desired base station and one interfering base station, which is denoted by the subscript I.

The local FDM pilots for different local areas may be orthogonalized in time and/or frequency by transmitting these local FDM pilots in different symbol periods and/or subbands, respectively. However, fewer pilot symbols would be sent for the local FDM pilot in each local area, and thus fewer pilot symbols would be available for local channel estimation.

The local FDM pilots for different local areas may also be orthogonalized and/or randomized in the code domain by using different orthogonal and/or pseudo-random sequences, respectively, for these local FDM pilots. Various code orthogonalization/randomization techniques may be used for the local FDM pilots, including orthogonal scrambling, random scrambling, and orthogonal and random scrambling.

For orthogonal scrambling, the local FDM pilots for different local areas are multiplied with orthogonal sequences across symbol periods. The pilot symbols for the desired and interfering local areas may then be expressed as:

$$P(k,n)=S(k)\cdot C(n) \text{ and } P_I(k,n)=S(k)\cdot C_I(n), \qquad \text{Eq (3)}$$

where {C(n)} is orthogonal to {$C_I(n)$}. As shown in equation (3), the same PN sequence is used to generate the first sequence of complex values {S(k)} for both the desired and interfering local areas. However, different orthogonal sequences {C(n)} and {$C_I(n)$} are used for the desired and interfering local areas.

A wireless device may derive a local channel estimate by first obtaining a complex channel gain estimate for each pilot subband used for the local FDM pilot, as follows:

$$\hat{H}_p(k)=P(k,n)/S(k) \qquad \text{Eq (4)}$$

Equation (4) removes the effects of the PN sequence across the pilot subbands, which is also called descrambling. The wireless device obtains P channel gain estimates for P uniformly distributed pilot subbands. The wireless device next performs a P-point inverse discrete Fourier transform (IDFT) on the P channel gain estimates to obtain a P-tap least-squares impulse response estimate, which may be expressed as:

$$\hat{h}_{os}(l,n) = h(l) \cdot C(n) + h_I(l) \cdot C_I(n) + w(l,n), \quad \text{Eq (5)}$$

where l is an index for the P' channel taps of the impulse response estimate;
- h(l) is the actual impulse response for the desired base station;
- $h_I(l)$ is the actual impulse response for the interfering base station;
- $\hat{h}_{os}(l,n)$ is the least-squares impulse response estimate for symbol period n, where the subscript "os" denotes orthogonal scrambling; and
- w(l,n) is the noise in symbol period n.

Equation (5) assumes that the actual channel impulse response for each base station is constant over the time duration of interest, so that h(l) and $h_I(l)$ are not functions of symbol period n.

An impulse response estimate $\tilde{h}_{os}(l)$ for the desired local area may then be obtained by filtering the least-squares impulse response estimates for different symbol periods, as follows:

$$\begin{aligned}\tilde{h}_{os}(l) &= \frac{1}{L} \cdot \sum_{n=-(L-1)/2}^{(L-1)/2} \hat{h}_{os}(l,n) \cdot C^*(n), \quad \text{Eq (6)}\\ &= \frac{1}{L} \cdot \sum_{n=-(L-1)/2}^{(L-1)/2} h(l) \cdot C(n) \cdot C^*(n) + h_I(l) \cdot C_I(n) \cdot\\ &\quad C^*(n) + w(l,n) \cdot C^*(n),\\ &= h(l) + \tilde{w}(l,n),\end{aligned}$$

where $$\sum_{n=-(L-1)/2}^{(L-1)/2} C_I(n) \cdot C^*(n) = 0$$

since C(n) and $C_I(n)$ are orthogonal sequences;
w(l,n) is the post-processed noise; and
L is the length of the orthogonal sequences (e.g., L=3).

The index of summation in equation (6) is for an odd value of L and is different for an even value of L. A wireless device located within the interfering local area may derive an impulse response estimate $\tilde{h}_{os,I}(l)$ for that local area by multiplying $\hat{h}_{os}(l,n)$ with $C_I^*(n)$ and integrating over the length of the orthogonal sequence. As shown in equation (6), orthogonal scrambling can cancel pilot interference from the neighboring local area. However, this orthogonality may be disturbed due to channel time variations.

The orthogonal sequences may be defined in various manners. In one embodiment, the orthogonal sequences are defined as follows:

$$C(n)=1 \text{ and } C_I(n)=e^{j2\pi \cdot n/L}, \text{ for } n=0 \ldots (L-1). \quad \text{Eq(7)}$$

For random scrambling, the pilot symbols for the desired local area are pseudo-random with respect to the pilot symbols for the interfering local area. The pilot symbols may be considered to be independently and identically distributed (i.i.d.) across time, frequency, and local areas. Pseudo-random pilot symbols may be obtained by initializing the PN generators for different local areas with different seed values that are dependent on symbol period n and the local area identifier.

For random scrambling, a least-squares impulse response estimate $\hat{h}_{rs}(l)$ may be obtained by performing (1) descrambling as shown in equation (4) to remove the PN sequence for the desired local area, (2) post processing to obtain P channel gain estimates, and (3) an IDFT on the P channel gain estimates, as described above. The least-squares impulse response estimate may be expressed as:

$$\hat{h}_{rs}(l) = h(l) + g_I(l,n) + w(l,n), \quad \text{Eq (8)}$$

where $g_I(l,n)$ is the interference to the l-th tap of $\hat{h}_{rs}(l)$ and the subscript "rs" denotes random scrambling. The interference $g_I(l,n)$ results from the channel impulse response $h_I(l)$ for the interfering local area being smeared across the P taps of $\hat{h}_{rs}(l)$ by the PN sequences for the local and interfering local areas. The least-squares impulse response estimate may be used directly as the impulse response estimate for the desired local area. Equation (8) indicates that random scrambling only smears out (and does not suppress or cancel) the pilot interference from the neighboring local area. Thresholding may be performed to retain channel taps that exceed a predetermined threshold and to zero out channel taps below the predetermined threshold. The thresholding can remove much of the pilot interference and may provide performance that is comparable to that achieved with orthogonal scrambling. In addition, with random scrambling, channel estimation performance is not dependent on orthogonality and may be more robust in certain operating environments.

For orthogonal and random scrambling, the local FDM pilots for different local areas are multiplied with different PN sequences across subbands and further multiplied with different orthogonal sequences across symbol periods. The pilot symbols for the desired and interfering local areas may be expressed as:

$$P(k,n)=S(k) \cdot C(n) \text{ and } P_I(k,n)=S_I(k) \cdot C_I(n), \quad \text{Eq(9)}$$

where {S(k)} and {$S_I(k)$} are different pseudo-random sequences, and {C(n)} and {$C_I(n)$} are different orthogonal sequences.

For orthogonal and random scrambling, a least-squares impulse response estimate $\hat{h}_{or}(l,n)$ may be obtained by performing the processing described above for orthogonal scrambling. The least-squares impulse response estimate may expressed as:

$$\hat{h}_{or}(l,n) = h(l) \cdot C(n) + g_I(l) \cdot C_I(n) + w(l,n), \quad \text{Eq (10)}$$

where the subscript "or" denotes orthogonal and random scrambling. An impulse response estimate $\tilde{h}_{or}(l)$ for the desired local area may be obtained by multiplying $\hat{h}_{or}(l,n)$ with $C^*(n)$ and integrating over the length of the orthogonal sequence, as shown in equation (6).

The sampled channel impulse response for each (local or wide) area contains up to N taps, where N=M·P. The channel impulse response may be viewed as being composed of a main channel and an excess channel. The main channel contains the first P taps of the channel impulse response. The excess channel contains the remaining N−P taps. If the FDM pilot is transmitted on one interlace with P subbands, then an impulse response estimate $\tilde{h}_{os}(l)$, $\hat{h}_{rs}(l)$, or $\tilde{h}_{or}(l)$ with P taps may be obtained based on the received FDM pilot. In general, the length of the impulse response estimate is determined by the number of different subbands used for the FDM pilot. A longer channel impulse response estimate with more than P taps may be obtained by transmitting the FDM pilot on more interlaces. For example, the FDM pilot may be transmitted on two different interlaces in different symbol periods, as shown in FIG. 7. Techniques for deriving the coefficients of the time-domain filters for the main and excess channels are described in commonly assigned U.S. patent application Ser. No. 10/926,884, entitled "Staggered Pilot Transmission for Channel Estimation and Time Tracking," filed Aug. 25, 2004.

Different channel estimates may be obtained for the local and wide areas. A wireless device may receive signals from base stations that are farther away for the wide-area transmission than for the local transmission. Consequently, the delay spread for the wide-area transmission may be longer than the delay spread for the local transmission. A longer channel impulse response estimate (e.g., of length 3P) may be derived for the wide area. A shorter channel impulse response estimate (e.g., of length 2P) may be derived for the local area.

A longer impulse response estimate for the wide area may be obtained by using more interlaces for the FDM pilot for the wide area. Alternatively, the same number of interlaces may be used for the FDM pilots for both the local and wide areas, and different time-domain filters may be used for the local and wide areas. The least-squares impulse response estimates for the wide area may be filtered with a first set of one or more time-domain filters to derive a filtered impulse response estimate with the desired number of taps (e.g., 3P taps) for the wide area. The least-squares impulse response estimates for the desired local area may be filtered with a second set of time-domain filters to derive a filtered impulse response estimate with the desired number of taps (e.g., 2P taps) for the desired local area.

In general, the time-domain filtering for channel estimation may be performed based on various considerations such as, e.g., the manner in which the FDM pilot is transmitted, the number of interlaces used for the FDM pilot, the desired length (or the number of taps) for the channel impulse response estimate, interference suppression and so on. Time-domain filtering may be performed differently on the FDM pilots for the local and wide-areas to obtain different filtered channel response estimates for the local and wide-areas.

The filtered impulse response estimate for a given (local or wide) area may be post-processed to further improve performance. The post-processing may include, e.g., setting the last Z taps to zero, where Z may be any integer value, setting taps with energy below a predetermined threshold to zero (thresholding), and so on. The post-processed channel taps may be transformed with an DFT to obtain the final frequency response estimate used for data detection and decoding.

Referring back to FIG. 5, the transition pilot may be used for channel estimation, time synchronization, acquisition (e.g., automatic gain control (AGC)), and so on. For example, the transition pilot may include the FDM pilot so that the time-domain filtering for each symbol period can be performed on received pilot symbols obtained for the current symbol period, at least one earlier symbol period, and at least one later symbol period. The transition pilot may also be used to obtain improved timing for the local transmission as well as the wide-area transmission.

4. Broadcast Transmission and Reception

Figure 8:
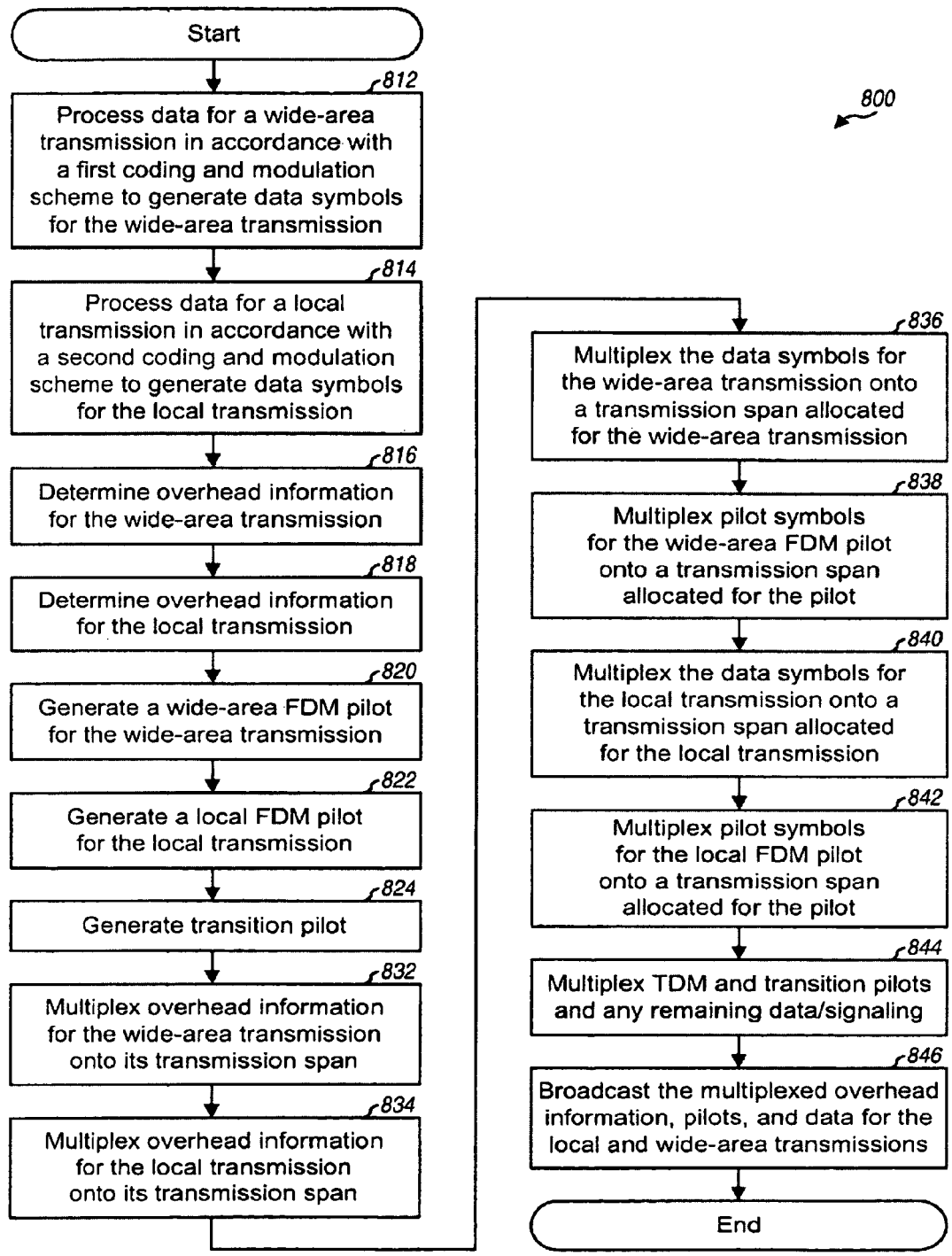
FIG. 8 shows a process for broadcasting local and wide-area transmissions.

FIG. 8 shows a flow diagram of a process 800 for broadcasting local and wide-area transmissions in network 100. Each base station in the network may perform process 800 in each scheduling interval, which may be, e.g., each symbol period for FDM structure 300 in FIG. 3A, each frame for TDM structure 400 in FIG. 4A, or each super-frame for super-frame structure 500 in FIG. 5.

Data for a wide-area transmission is processed in accordance with a first coding and modulation scheme (or mode) selected for the wide-area transmission to generate data symbols for the wide-area transmission (block 812). Data for a local transmission is processed in accordance with a second coding and modulation scheme selected for the local transmission to generate data symbols for the local transmission (block 814). Different coding and modulation schemes may be used for the local and wide-area transmissions to achieve the desired coverage. Overhead information for the local and wide-area transmissions is determined (blocks 816 and 818). FDM pilot for the wide area, FDM pilot for the local area, and transition pilot are generated (blocks, 822, 824, and 826, respectively).

The overhead information for the wide-area transmission and the overhead information for the local transmission are multiplexed onto their designated transmission spans (blocks 832 and 834). The data symbols for the wide-area transmission are multiplexed onto a transmission span allocated for the wide-area transmission (block 836), and pilot symbols for the wide-area FDM pilot are multiplexed onto a transmission span allocated for this pilot (block 838). Similarly, the data symbols for the local transmission are multiplexed onto a transmission span allocated for the local transmission (block 840), and pilot symbols for the local FDM pilot are multiplexed onto a transmission span allocated for this pilot (block 842). Each transmission span may correspond to a group of subbands (e.g., for FDM structure 300), a time segment (e.g., for TDM structure 400), a group of subbands in a time segment (e.g., for super-frame structure 500), or some other time-frequency allocation. TDM and transition pilots, other signaling, and other data may also be multiplexed (block 844). The multiplexed overhead information, pilots, and data for the local and wide-area transmissions are then broadcast (block 846).

Figure 9:
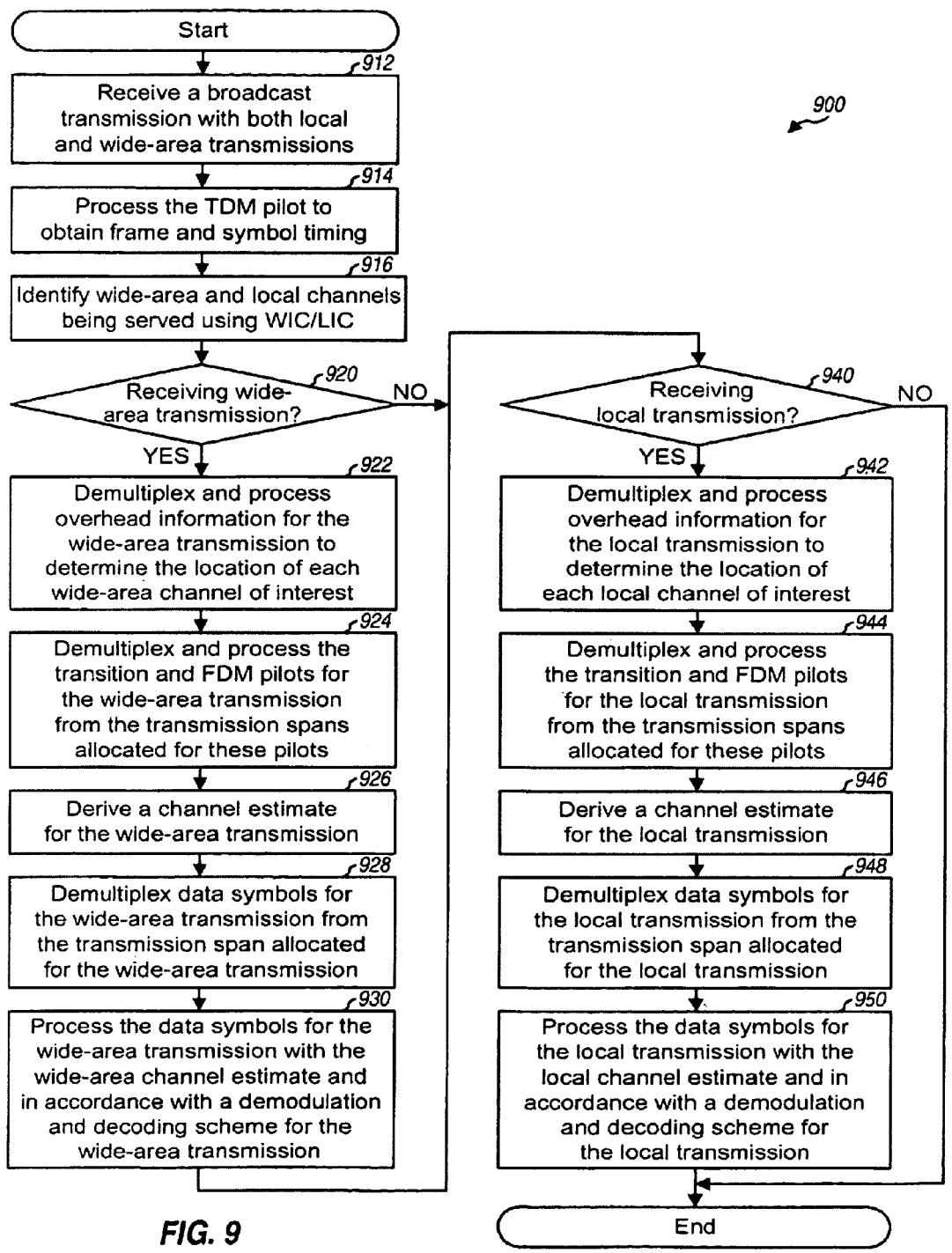
FIG. 9 shows a process for receiving local and wide-area transmissions.

FIG. 9 shows a flow diagram of a process 900 for receiving local and wide-area transmissions broadcast by network 100. A wireless device in the network may perform process 900 in each scheduling interval.

The wireless device receives a broadcast transmission with both local and wide-area transmissions (block 912). The wireless device processes the TDM pilot to obtain frame and symbol timing, estimate and correct frequency error, and so on (block 914). The wireless device identifies wide-area and local channels being served using the WIC and LIC, respectively, which are shown in FIG. 5 (block 916). The wireless device may thereafter recover the local transmission, the wide-area transmission, or both the local and wide-area transmissions from the received broadcast transmission.

If the wireless device is receiving the wide-area transmission, as determined in block 920, then the wireless device demultiplexes and processes overhead information for the wide-area transmission to determine the time-frequency location of each wide-area channel of interest (block 922). The wireless device also demultiplexes and processes the wide-area FDM and transition pilots from the transmission spans allocated for these pilots (block 924) and derives a channel estimate for the wide area (block 926). The wireless device demultiplexes data symbols for the wide-area channels of interest from the transmission span allocated for the wide-area transmission (block 928). The wireless device then processes the data symbols for the wide-area transmission with the wide-area channel estimate and further in accordance with a demodulation and decoding scheme applicable for the wide-area transmission and recovers the data for each wide-area channel of interest (block 930).

If the wireless device is receiving the local transmission, as determined in block 940, then the wireless device demultiplexes and processes overhead information for the local transmission to determine the time-frequency location of each local channel of interest (block 942). The wireless device also demultiplexes and processes the local FDM and transition pilots from the transmission spans allocated for these pilots (block 944) and derives a channel estimate for the desired local area (block 946). The wireless device demultiplexes data symbols for the local channels of interest from the transmission span allocated for the local transmission (block 948). The wireless device then processes the data symbols for the local transmission with the local channel estimate and further in accordance with a demodulation and decoding scheme applicable for the local transmission and recovers the data for each local channel of interest (block 950).

If the wireless device is receiving both local and wide-area transmissions, then the wireless device may perform the processing in a different order than the order shown in FIG. 9. For example, the wireless device may demultiplex and process the overhead information for both local and wide-area transmissions as this information is received.

5. System

Figure 10:
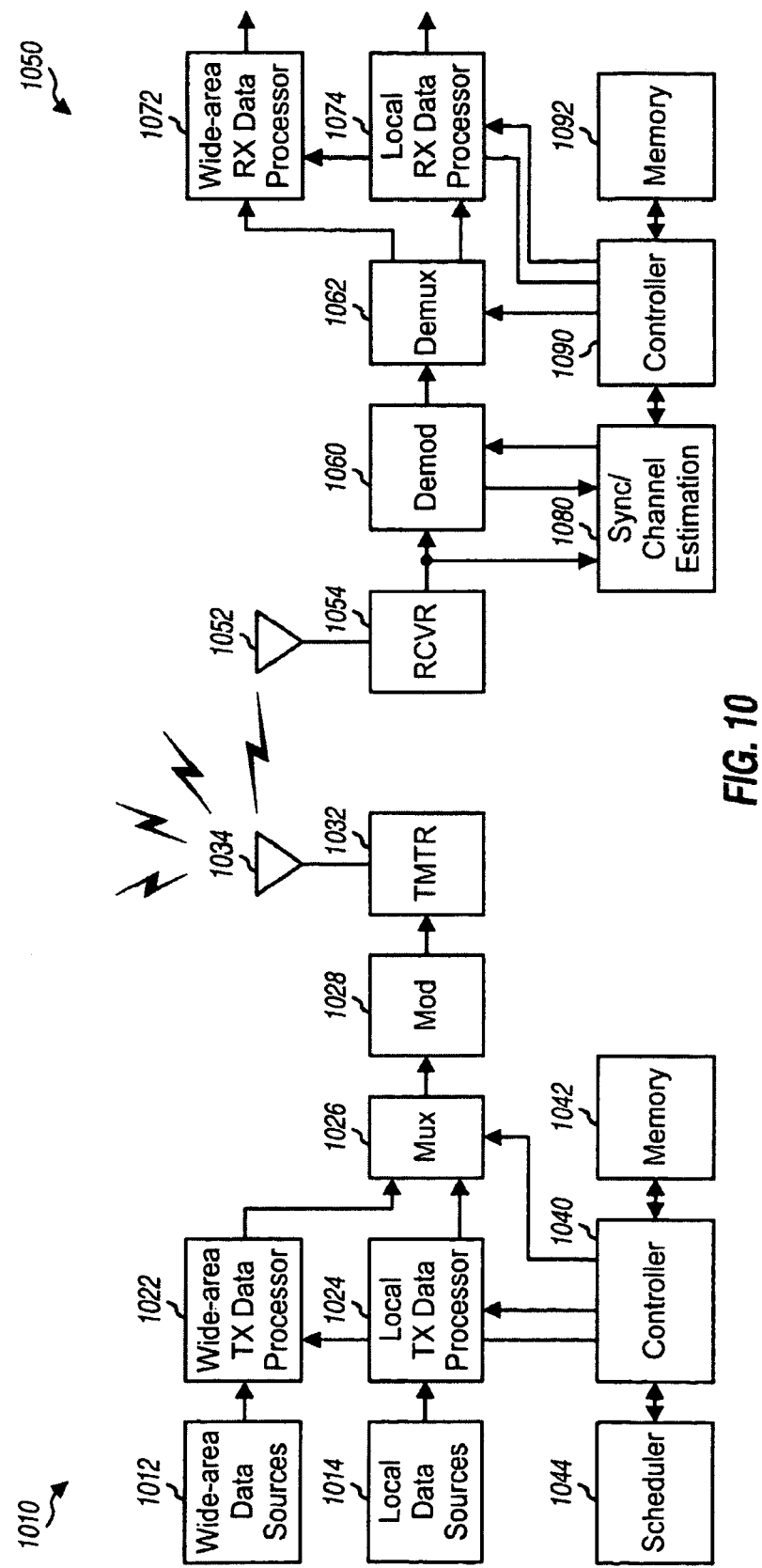
FIG. 10 shows a block diagram of a base station and a wireless device.

FIG. 10 shows a block diagram of a base station 1010 and a wireless device 1050 in wireless broadcast network 100 in FIG. 1. Base station 1010 is generally a fixed station and may also be called an access point, a transmitter, or some other terminology. Wireless device 1050 may be fixed or mobile and may also be called a user terminal, a mobile station, a receiver, or some other terminology. Wireless device 1050 may also be a portable unit such as a cellular phone, a hand-held device, a wireless module, a personal digital assistant (PDA), and so on.

At base station 1010, a transmit (TX) data processor 1022 receives data for a wide-area transmission from sources 1012, processes (e.g., encodes, interleaves, and symbol maps) the wide-area data, and generates data symbols for the wide-area transmission. A data symbol is a modulation symbol for data, and a modulation symbol is a complex value for a point in a signal constellation for a modulation scheme (e.g., M-PSK, M-QAM, and so on). TX data processor 1022 also generates the FDM and transition pilots for the wide area in which base station 1010 belongs and provides the data and pilot symbols for the wide area to a multiplexer (Mux) 1026. A TX data processor 1024 receives data for a local transmission from sources 1014, processes the local data, and generates data symbols for the local transmission. TX data processor 1024 also generates the FDM and transition pilots for the local area in which base station 1010 belongs and provides the data and pilot symbols for the local area to multiplexer 1026. The coding and modulation for data may be selected based on various factors such as, for example, whether the data is for wide-area or local transmission, the data type, the desired coverage for the data, and so on.

Multiplexer 1026 multiplexes the data and pilot symbols for the local and wide areas as well as symbols for overhead information and the TDM pilot onto the subbands and symbol periods allocated for these symbols. A modulator (Mod) 1028 performs modulation in accordance with the modulation technique used by network 100. For example, modulator 1028 may perform OFDM modulation on the multiplexed symbols to generate OFDM symbols. A transmitter unit (TMTR) 1032 converts the symbols from modulator 1028 into one or more analog signals and further conditions (e.g., amplifies, filters, and frequency upconverts) the analog signal(s) to generate a modulated signal. Base station 1010 then transmits the modulated signal via an antenna 1034 to wireless devices in the network.

At wireless device 1050, the transmitted signal from base station 1010 is received by an antenna 1052 and provided to a receiver unit (RCVR) 1054. Receiver unit 1054 conditions (e.g., filters, amplifies, and frequency downconverts) the received signal and digitizes the conditioned signal to generate a stream of data samples. A demodulator (Demod) 1060 performs (e.g., OFDM) demodulation on the data samples and provides received pilot symbols to a synchronization (Sync)/channel estimation unit 1080. Unit 1080 also receives the data samples from receiver unit 1054, determines frame and symbol timing based on the data samples, and derives channel estimates for the local and wide areas based on the received pilot symbols for these areas. Unit 1080 provides the symbol timing and channel estimates to demodulator 1060 and provides the frame timing to demodulator 1060 and/or a controller 1090. Demodulator 1060 performs data detection on the received data symbols for the local transmission with the local channel estimate, performs data detection on the received data symbols for the wide-area transmission with the wide-area channel estimate, and provides detected data symbols for the local and wide-area transmissions to a demultiplexer (Demux) 1062. The detected data symbols are estimates of the data symbols sent by base station 1010 and may be provided in log-likelihood ratios (LLRs) or some other form.

Demultiplexer 1062 provides detected data symbols for all wide-area channels of interest to a receive (RX) data processor 1072 and provides detected data symbols for all local channels of interest to an RX data processor 1074. RX data processor 1072 processes (e.g., deinterleaves and decodes) the detected data symbols for the wide-area transmission in accordance with an applicable demodulation and decoding scheme and provides decoded data for the wide-area transmission. RX data processor 1074 processes the detected data symbols for the local transmission in accordance with an applicable demodulation and decoding scheme and provides decoded data for the local transmission. In general, the processing by demodulator 1060, demultiplexer 1062, and RX data processors 1072 and 1074 at wireless device 1050 is complementary to the processing by modulator 1028, multiplexer 1026, and TX data processors 1022 and 1024, respectively, at base station 1010.

Controllers 1040 and 1090 direct operation at base station 1010 and wireless device 1050, respectively. Memory units 1042 and 1092 store program codes and data used by controllers 1040 and 1090, respectively. A scheduler 1044 schedules the broadcast of local and wide-area transmissions and allocates and assigns resources for the different transmission types.

For clarity, FIG. 10 shows the data processing for the local and wide-area transmissions being performed by two different data processors at both base station 1010 and wireless device 1050. The data processing for all types of transmission may be performed by a single data processor at each of base station 1010 and wireless device 1050. FIG. 10 also shows the processing for two different types of transmission. In general, any number of types of transmission with different coverage areas may be transmitted by base station 1010 and received by wireless device 1050. For clarity, FIG. 10 also shows all of the units for base station 1010 being located at the same site. In general, these units may be located at the same or different sites and may communicate via various communication links. For example, data sources 1012 and 1014 may be located off site, transmitter unit 1032 and/or antenna 1034 may be located at a transmit site, and so on.

The multiplexing schemes described herein (e.g., in FIGS. 3A, 4A and 5) have various advantages over a conventional scheme that broadcasts different types of transmission on different RF channels. First, the multiplexing schemes described herein can provide more frequency diversity than the conventional scheme since each type of transmission is transmitted across the entire system bandwidth instead of on a single RF channel. Second, the multiplexing schemes described herein allow receiver unit 1054 to receive and demodulate all types of transmission with a single RF unit that is tuned to a single RF frequency. This simplifies the design of the wireless device. In contrast, the conventional scheme may require multiple RF units to recover the different types of transmission sent on different RF channels.

The techniques described herein for broadcasting different types of transmission over the air may be implemented by various means. For example, these techniques may be implemented in hardware, software, or a combination thereof. For a hardware implementation, the processing units at a base station used to broadcast different types of transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device used to receive different types of transmission may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 1042 or 1092 in FIG. 10) and executed by a processor (e.g., controller 1040 or 1090). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of broadcasting data in a wireless broadcast network, comprising:
multiplexing data for a wide-area transmission onto a first transmission span, the wide-area transmission being sent from a plurality of transmitters in the network;
multiplexing data for a local transmission onto a second transmission span, wherein the multiplexing is onto frequency subbands pseudo-randomly selected from among all usable frequency subbands and the local transmission being sent from a subset of the plurality of transmitters;
selecting the first and second transmission spans based on an amount of data to broadcast for the wide-area transmission and an amount of data to broadcast for the local transmission; and
broadcasting the local and wide-area transmissions via a wireless link,
wherein the data for the wide-area transmission and the data for the local transmission are time division multiplexed (TDM) at each base station, and wherein the first and second transmission spans are first and second time segments, respectively, of a frame of a predetermined time duration.

2. The method of claim 1, further comprising:
processing the data for the wide-area transmission in accordance with a first coding and modulation scheme, wherein the processed data for the wide-area transmission is multiplexed onto the first transmission span; and
processing the data for the local transmission in accordance with a second coding and modulation scheme, wherein the processed data for the local transmission is multiplexed onto the second transmission span.

3. The method of claim 2, wherein the second coding and modulation scheme has a lower spectral efficiency than the first coding and modulation scheme to extend coverage for the local transmission.

4. The method of claim 2, wherein the first coding and modulation scheme has a lower spectral efficiency than the second coding and modulation scheme.

5. The method of claim 2, further comprising:
multiplexing a first pilot onto a third transmission span, the first pilot being suitable for deriving a first channel estimate for the wide-area transmission; and
multiplexing a second pilot onto a fourth transmission span, the second pilot being suitable for deriving a second channel estimate for the local transmission.

6. The method of claim 5, wherein the first coding and modulation scheme has a lower spectral efficiency than the second coding and modulation scheme.

7. The method of claim 6, wherein the first and second coding and modulation schemes are selected based on desired coverage for the wide-area and local transmissions, respectively.

8. The method of claim 5, further comprising generating the second pilot with a pseudo-random sequence assigned to the subset of the plurality of transmitters, wherein the second pilot for the subset of the plurality of transmitters is pseudo-random with respect to at least one other second pilot for at least one other subset of the plurality of transmitters.

9. The method of claim 1, further comprising adjusting the first and second transmission spans based on time of day.

10. The method of claim 9, wherein the first and second transmission spans are based on a predetermined schedule.

11. An apparatus in a wireless broadcast network, comprising:
means for multiplexing data for a wide-area transmission onto a first transmission span, the wide-area transmission being sent from a plurality of transmitters in the network;
means for multiplexing data for a local transmission onto a second transmission span, wherein the multiplexing is onto frequency subbands pseudo-randomly selected from among all usable frequency subbands and the local transmission being sent from a subset of the plurality of transmitters;
means for selecting the first and second transmission spans based on an amount of data to broadcast for the wide-area transmission and an amount of data to broadcast for the local transmission; and
means for broadcasting the local and wide-area transmissions via a wireless link,
wherein the wireless broadcast network utilizes orthogonal frequency division multiplexing (OFDM), wherein the data for the wide-area transmission and the data for the local transmission are time division multiplexed (TDM) at each base station, and wherein the first and second transmission spans are first and second time segments, respectively, of a frame of a predetermined time duration.

12. The apparatus of claim 11, further comprising:
means for processing the data for the wide-area transmission in accordance with a first coding and modulation scheme, wherein the processed data for the wide-area transmission is multiplexed onto the first transmission span; and
means for processing the data for the local transmission in accordance with a second coding and modulation scheme, wherein the processed data for the local transmission is multiplexed onto the second transmission span.

13. The apparatus of claim 12, wherein the second coding and modulation scheme has a lower spectral efficiency than the first coding and modulation scheme to extend coverage for the local transmission.

14. The apparatus of claim 12, wherein the first coding and modulation scheme has a lower spectral efficiency than the second coding and modulation scheme.

15. The apparatus of claim 12, further comprising:
means for multiplexing a first pilot onto a third transmission span, the first pilot being suitable for deriving a first channel estimate for the wide-area transmission; and
means for multiplexing a second pilot onto a fourth transmission span, the second pilot being suitable for deriving a second channel estimate for the local transmission.

16. The apparatus of claim 15, wherein the first coding and modulation scheme has a lower spectral efficiency than the second coding and modulation scheme.

17. The apparatus of claim 16, wherein the first and second coding and modulation schemes are selected based on desired coverage for the wide-area and local transmissions, respectively.

18. The apparatus of claim 15, further comprising means for generating the second pilot with a pseudo-random sequence assigned to the subset of the plurality of transmitters, wherein the second pilot for the subset of the plurality of transmitters is pseudo-random with respect to at least one other second pilot for at least one other subset of the plurality of transmitters.

19. The apparatus of claim 11, further comprising means for adjusting the first and second transmission spans based on time of day.

20. The apparatus of claim 19, wherein the first and second transmission spans are based on a predetermined schedule.

21. A wireless device for broadcasting data in a wireless broadcast network, comprising:
a multiplexer for multiplexing data for a wide-area transmission onto a first transmission span, the wide-area transmission being sent from a plurality of transmitters in the network, and for multiplexing data for a local transmission onto a second transmission span, wherein the multiplexing is onto frequency subbands pseudo-randomly selected from among all usable frequency subbands and the local transmission being sent from a subset of the plurality of transmitters;
a processor coupled to the multiplexer for selecting the first and second transmission spans based on an amount of data to broadcast for the wide-area transmission and an amount of data to broadcast for the local transmission; and
a transmitter coupled to the processor for broadcasting the local and wide-area transmissions via a wireless link, wherein the data for the wide-area transmission and the data for the local transmission are time division multiplexed (TDM) at each base station, and wherein the first and second transmission spans are first and second time segments, respectively, of a frame of a predetermined time duration.

22. The wireless device of claim 21, wherein the processor further comprises
a wide-area transmit data processor for processing the data for the wide-area transmission in accordance with a first coding and modulation scheme, wherein the processed data for the wide-area transmission is multiplexed onto the first transmission span; and
a local transmit data processor for processing the data for the local transmission in accordance with a second coding and modulation scheme, wherein the processed data for the local transmission is multiplexed onto the second transmission span.

23. The wireless device of claim 22, wherein the second coding and modulation scheme has a lower spectral efficiency than the first coding and modulation scheme to extend coverage for the local transmission.

24. The wireless device of claim 22, wherein the first coding and modulation scheme has a lower spectral efficiency than the second coding and modulation scheme.

25. The wireless device of claim 22, wherein the multiplexer is further configured to multiplex a first pilot onto a third transmission span, the first pilot being suitable for deriving a first channel estimate for the wide-area transmission, and multiplex a second pilot onto a fourth transmission span, the second pilot being suitable for deriving a second channel estimate for the local transmission.

26. The wireless device of claim 25, wherein the first coding and modulation scheme has a lower spectral efficiency than the second coding and modulation scheme.

27. The wireless device of claim 26, wherein the first and second coding and modulation schemes are selected based on desired coverage for the wide-area and local transmissions, respectively.

28. The wireless device of claim 25, wherein the local transmit data processor is further configured to generate the second pilot with a pseudo-random sequence assigned to the subset of the plurality of transmitters, wherein the second pilot for the subset of the plurality of transmitters is pseudo-random with respect to at least one other second pilot for at least one other subset of the plurality of transmitters.

29. The wireless device of claim 21, wherein the processor is further configured to adjust the first and second transmission spans based on time of day.

30. The wireless device of claim 29, wherein the first and second transmission spans are based on a predetermined schedule.

31. A method of receiving data in a wireless broadcast network, comprising:
receiving via a wireless link a broadcast transmission comprised of a wide-area transmission and a local transmission, the wide-area transmission being sent from a plurality of transmitters in the network, and the local transmission being sent from a subset of the plurality of transmitters;
demultiplexing the data for the wide-area transmission from a first transmission span when the wide-area transmission is received; and
demultiplexing the data for the local transmission from a second transmission span when the local transmission is received, wherein the data for the local transmission are multiplexed onto frequency subbands pseudo-randomly selected from among all usable frequency subbands, wherein the data for the wide-area transmission and the data for the local transmission are time division multiplexed (TDM) at each base station, and wherein the first and second transmission spans are a first time segment and a second time segment, respectively, of a frame and are based on an amount of data broadcast on the wide-area transmission and an amount of data broadcast on the local transmission.

32. The method of claim 31, wherein the data for the wide-area transmission is frequency division multiplexed (FDM) with the data for the local transmission, and wherein the first and second transmission spans are obtained with multi-carrier modulation.

33. The method of claim 32, wherein the first time segment for the wide-area transmission is prior to the second time segment for the local transmission.

34. The method of claim 33, wherein the first transmission span includes all frequency subbands usable for data transmission in the first time segment of the frame, and wherein the second transmission span includes all frequency subbands usable for data transmission in the second time segment of the frame.

35. The method of claim 31, further comprising:
if the wide-area transmission is being received, demultiplexing overhead information for the wide-area transmission from a third transmission span; and
if the local transmission is being received, demultiplexing overhead information for the local transmission from a fourth transmission span.

36. The method of claim 35, wherein the overhead information for the wide-area transmission indicates frequency and time location of each data channel for the wide-area transmission, and wherein the overhead information for the local transmission indicates frequency and time location of each data channel for the local transmission.

37. The method of claim 31, further comprising:
if the wide-area transmission is being received,
demultiplexing a first pilot from a third transmission span,
deriving a first channel estimate for the wide-area transmission based on the first pilot, and
processing the data for the wide-area transmission with the first channel estimate; and
if the local transmission is being received,
demultiplexing a second pilot from a fourth transmission span,
deriving a second channel estimate for the local transmission based on the second pilot, and
processing the data for the local transmission with the second channel estimate.

38. The method of claim 37, further comprising:
if the wide-area transmission is being received, processing the first pilot with a first set of at least one time-domain filter to derive the first channel estimate; and
if the local transmission is being received, processing the second pilot with a second set of at least one time-domain filter to derive the second channel estimate.

39. The method of claim 38, wherein the first and second channel estimates are respectively associated with a first impulse response estimate and a second impulse response estimate having different lengths.

40. The method of claim 39, further comprising:
performing thresholding to zero out channel taps of the first impulse response estimate that are below a first predetermined threshold; and
performing thresholding to zero out channel taps of the second impulse response estimate that are below a second predetermined threshold.

41. A wireless device for receiving data in a wireless broadcast network, comprising:
a receiver for receiving via a wireless link a broadcast transmission comprised of a wide-area transmission and a local transmission, the wide-area transmission being sent from a plurality of transmitters in the network, and the local transmission being sent from a subset of the plurality of transmitters; and
a demultiplexer configured to demultiplex the data for the wide-area transmission from a first transmission span if the wide-area transmission is being received, and to demultiplex the data for the local transmission from a second transmission span if the local transmission is being received, wherein the data for the local transmission are multiplexed onto frequency subbands pseudo-randomly selected from among all usable frequency subbands, wherein the data for the wide-area transmission and the data for the local transmission are time division multiplexed (TDM) at each base station, and wherein the first and second transmission spans are a first time segment and a second time segment, respectively, of a frame and are based on an amount of data broadcast on the wide-area transmission and an amount of data broadcast on the local transmission.

42. The wireless device of claim 41, wherein the data for the wide-area transmission is frequency division multiplexed (FDM) with the data for the local transmission, and wherein the first and second transmission spans are obtained with multi-carrier modulation.

43. The wireless device of claim 42, wherein the first time segment for the wide-area transmission is prior to the second time segment for the local transmission.

44. The wireless device of claim 43, wherein the first transmission span includes all frequency subbands usable for data transmission in the first time segment of the frame, and wherein the second transmission span includes all frequency subbands usable for data transmission in the second time segment of the frame.

45. The wireless device of claim 41, wherein the demultiplexer is further configured to demultiplex overhead information for the wide-area transmission from a third transmission span if the wide-area transmission is being received, and demultiplex overhead information for the local transmission from a fourth transmission span if the local transmission is being received.

46. The wireless device of claim 45, wherein the overhead information for the wide-area transmission indicates frequency and time location of each data channel for the wide-area transmission, and wherein the overhead information for the local transmission indicates frequency and time location of each data channel for the local transmission.

47. The wireless device of claim 41, wherein the demultiplexer is further configured to demultiplex a first pilot from a third transmission span if the wide-area transmission is being received and to demultiplex a second pilot from a fourth transmission span if the local transmission is being received; and the wireless device further comprising:
a synchronization/channel estimation unit for deriving a first channel estimate for the wide-area transmission based on the first pilot if the wide-area transmission is being received, and deriving a second channel estimate for the local transmission based on the second pilot if the local transmission is being received; and
a demodulator for processing the data for the wide-area transmission with the first channel estimate if the wide-area transmission is being received, and for processing the data for the local transmission with the second channel estimate if the local transmission is being received.

48. The wireless device of claim 47, further comprising:

a wide-area receive data processor for processing the first pilot with a first set of at least one time-domain filter to derive the first channel estimate if the wide-area transmission is being received; and a local receive data processor for processing the second pilot with a second set of at least one time-domain filter to derive the second channel estimate if the local transmission is being received.

49. The wireless device of claim 48, wherein the first and second channel estimates are respectively associated with a first impulse response estimate and a second impulse response estimate having different lengths.

50. The wireless device of claim 49, further comprising a synchronization/channel estimation unit for performing thresholding to zero out channel taps of the first impulse response estimate that are below a first predetermined threshold, and performing thresholding to zero out channel taps of the second impulse response estimate that are below a second predetermined threshold.

* * * * *

UNITED STATES PATENT AND TRADEMARK OFFICE
CERTIFICATE OF CORRECTION

PATENT NO. : 7,881,245 B2
APPLICATION NO. : 12/506055
DATED : February 1, 2011
INVENTOR(S) : Vijayan et al.

Page 1 of 1

It is certified that error appears in the above-identified patent and that said Letters Patent is hereby corrected as shown below:

Cover page item (75), line 4, Inventor name: "Ramaaswamy Murali" should read as --Murali Ramaswamy Chari--

Cover page item (60), lines 1-2, Related U.S. Application data: "Oct. 14, 2003" should read as --Oct. 24, 2003--

Column 01, line 10, Related U.S. Application data: "Oct. 24, 2009" should read as --Oct. 24, 2003--

Signed and Sealed this
Eighteenth Day of September, 2012

David J. Kappos
*Director of the United States Patent and Trademark Office*